(12) United States Patent
Bernstein et al.

(10) Patent No.: US 7,526,503 B2
(45) Date of Patent: Apr. 28, 2009

(54) INTERACTIVE SCHEMA TRANSLATION WITH INSTANCE-LEVEL MAPPING

(75) Inventors: Philip A. Bernstein, Bellevue, WA (US); Sergey Melnik, Kirkland, WA (US); Peter D. Mork, Rockville, MD (US)

(73) Assignee: Microsoft Corporation, Redmond, WA (US)

( * ) Notice: Subject to any disclaimer, the term of this patent is extended or adjusted under 35 U.S.C. 154(b) by 349 days.

(21) Appl. No.: 11/204,338

(22) Filed: Aug. 15, 2005

(65) Prior Publication Data

US 2007/0038651 A1 Feb. 15, 2007

(51) Int. Cl.
*G06F 17/00* (2006.01)

(52) U.S. Cl. .................. 707/103 Y; 707/2; 717/104; 717/114; 717/137

(58) Field of Classification Search .......... 707/100, 707/103 R, 103 Y, 103 X, 103 Z, 104.1, 104, 707/2, 3; 717/104, 114, 137
See application file for complete search history.

(56) References Cited

U.S. PATENT DOCUMENTS

| | | | | |
|---|---|---|---|---|
| 5,937,410 | A * | 8/1999 | Shen | 707/103 R |
| 6,360,223 | B1 * | 3/2002 | Ng et al. | 707/100 |
| 7,289,997 | B1 * | 10/2007 | Kita et al. | 707/100 |
| 2005/0114394 | A1 * | 5/2005 | Kaipa et al. | 707/104.1 |
| 2005/0149484 | A1 * | 7/2005 | Fox et al. | 707/1 |
| 2006/0167909 | A1 * | 7/2006 | Mendis et al. | 707/101 |

OTHER PUBLICATIONS

Gabor Karsai, On the Use of Graph Transformation in the Formal Speciication of Model Interpreters, 2003, Jouranl of Universal Coputer Science, vol. 9, No. 11, p. 1296-1319.*
Richard Lemesle, Transformation Rules Based on Meta-modeling, 1998, IEEE, p. 113-122.*
Krzysztof Czarnecki, Classification of Model Transformation Approaches, 2003, p. 1-17.*
Shane Sendall, Combining Generative and Graph Transformation Techniques for Model Transformation: An Effective Alliance, 2003, Software Modeling and Verification Laboratory Computer Science Department.*
U.S. Appl. No. 10/950,988, filed Sep. 27, 2004, Atzeni, et al.
Bernstein, Phillip A. "Applying Model Management to Classical Meta Data Problems." 2003 CIDR Conference, 12 pages, Microsoft Research, Redmond, WA.
Nash, Alan, Phillip A. Bernstein, & Sergy Melnik. "Comparison of Mappings Given by Embedded Dependencies." PODS 2005, pp. 172-183, Jun. 13-15, 2005, Baltimore, MD.

(Continued)

*Primary Examiner*—Hosain T Alam
*Assistant Examiner*—Amy Ng
(74) *Attorney, Agent, or Firm*—Amin, Turocy & Calvin, LLP

(57) ABSTRACT

A system and method facilitating data access operations is provided. The system can facilitate an executable, instance-level interaction between a source model (e.g., schema) expressed in a first metamodel (e.g., object-oriented metamodel) and a target model expressed in a second metamodel (e.g., SQL metamodel). The system can produce instance mappings to round-trip the data between the source schema and the generated target schema. Further, an abstraction component can be employed to translate the data access operations on the object model into SQL queries and updates.

12 Claims, 13 Drawing Sheets

OTHER PUBLICATIONS

Melkik, Sergey, Phillip A. Bernstein, Alon Halevy, & Erhard Rahm. "Supporting Executable Mappings in Model Management." SIGMOD 2005, pp. 167-178, Jun. 14-16, 2005, Baltimore, MD.

Atzeni, Paolo, Paolo Cappellari, Phillip A. Bernstein, "ModelGen: Model Independent Schema Translation." 2 pages. Apr. 5-8, 2005. In Proc. ICDE., Tokyo, Japan.

Atzeni, Paolo and Riccardo Torlone. "Management of Multiple Models in an Extensible Database Design Tool." Extending Database Technology. pp. 79-95, 1996.

Abiteboul, Serge; Hull, Richard; Vianu, Victor. Foundations of Databases. 1995. Addison-Wesley Publishing Company, Reading, MA.

* cited by examiner

Forward view:
TupleType(z) ⇔ ∃x∃y (attr(x, y) ∧ z = Skolem(x, y))
from(z, x) ⇔ ∃y (attr(x, y) ∧ z = Skolem(x, y))
to(z, y) ⇔ ∃x (attr(x, y) ∧ z = Skolem(x, y))

Backward view:
attr(x, y) ⇔ ∃z (from(z, x) ∧ to(z, y))

INTERACTIVE SCHEMA TRANSLATION WITH INSTANCE-LEVEL MAPPING

BACKGROUND

The free flow of information prevalent today in wired and wireless regimes demands that the source and destination be compatible insofar as storing and interpreting the data for use. The world is populated with information sources where in many cases the data is represented differently from source to source. A major problem facing companies and individuals today is that data existing in one model/schema may be needed in a different model/schema for another purpose. However, such processes are being hampered by a largely disparate and ever-changing set of models/schemas. Such an example can be found in data warehousing where data is received from many different sources for storage and quick access from other sources. Converting data from one model to another model is not only time-consuming and resource intensive, but can be fraught with conversion problems.

The problem of model translation can arise in many contexts. For example, it can be used to generate an implementation from a design (e.g., generate a SQL schema from an ER model and/or generate a C# interface definition from a UML model). It can be used to generate a wrapper for an interface (e.g., generate an XML or OO wrapper for a SQL schema). It can be used to generate a database schema to store program structures (e.g., translate OO type definitions into a SQL schema). Additionally, model translation can be used to translate an interface definition from one language to another (e.g., a Java interface to a C# interface).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A data interaction system and method are provided. The system can facilitate an executable, instance-level interaction between a source model (e.g., schema) expressed in a first metamodel (e.g., object-oriented metamodel) and a target model expressed in a second metamodel (e.g., SQL metamodel).

The system can produce instance mappings to round-trip the data between the source schema and the generated target schema. For example, the system can support object-to-relational mapping scenarios that are common in business applications. Typically, in such applications the business logic runs on top of an object model, whereas the actual data is persisted in SQL databases. The mappings can be stored to a computer-readable medium by a storage component.

To shield the applications from impedance mismatch and storage management issues, an abstraction component can be employed to translate the data access operations on a first model (e.g., the object model) into operations on a second model (e.g., SQL queries and updates).

The mappings produced by the system can be used to drive the abstraction component, and, for example, to rewrite queries on objects as queries on relations. The mappings can be expressed in a standard logic-based data transformation language (e.g., Datalog) or using algebraic operators. The system supports a wide range of alternatives for persisting objects as relations. For example, the system can compile the instance mappings into SQL views to reassemble the objects stored in relational tables. The schema translation process is driven by high-level rules that eliminate constructs that are absent from the target metamodel.

Further, optionally, the system can support interactive editing such that incremental modifications of the source schema yield incremental modifications of the target schema. An optional mechanism for mapping inheritance hierarchies to relations, which supports known strategies and their combination, is also provided.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features of the claimed subject matter may become apparent from the following detailed description when considered in conjunction with the drawings.

DETAILED DESCRIPTION

Figure 1:
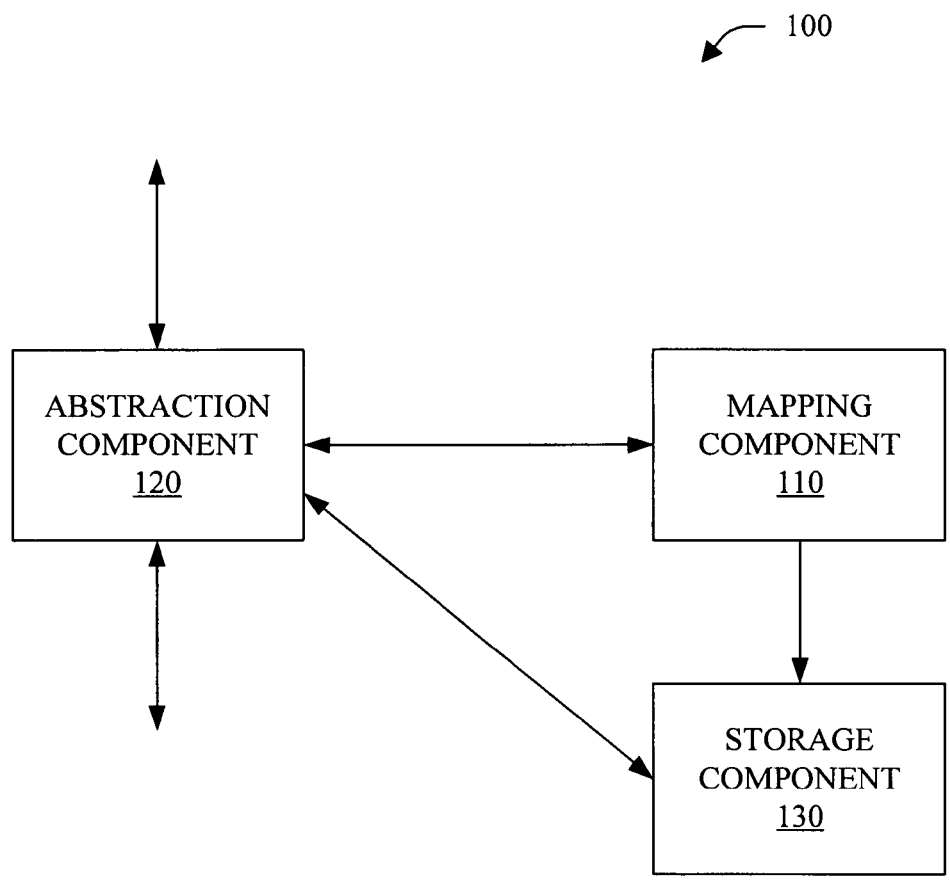
FIG. 1 is a block diagram of a data interaction system.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the claimed subject matter.

Figure 2:
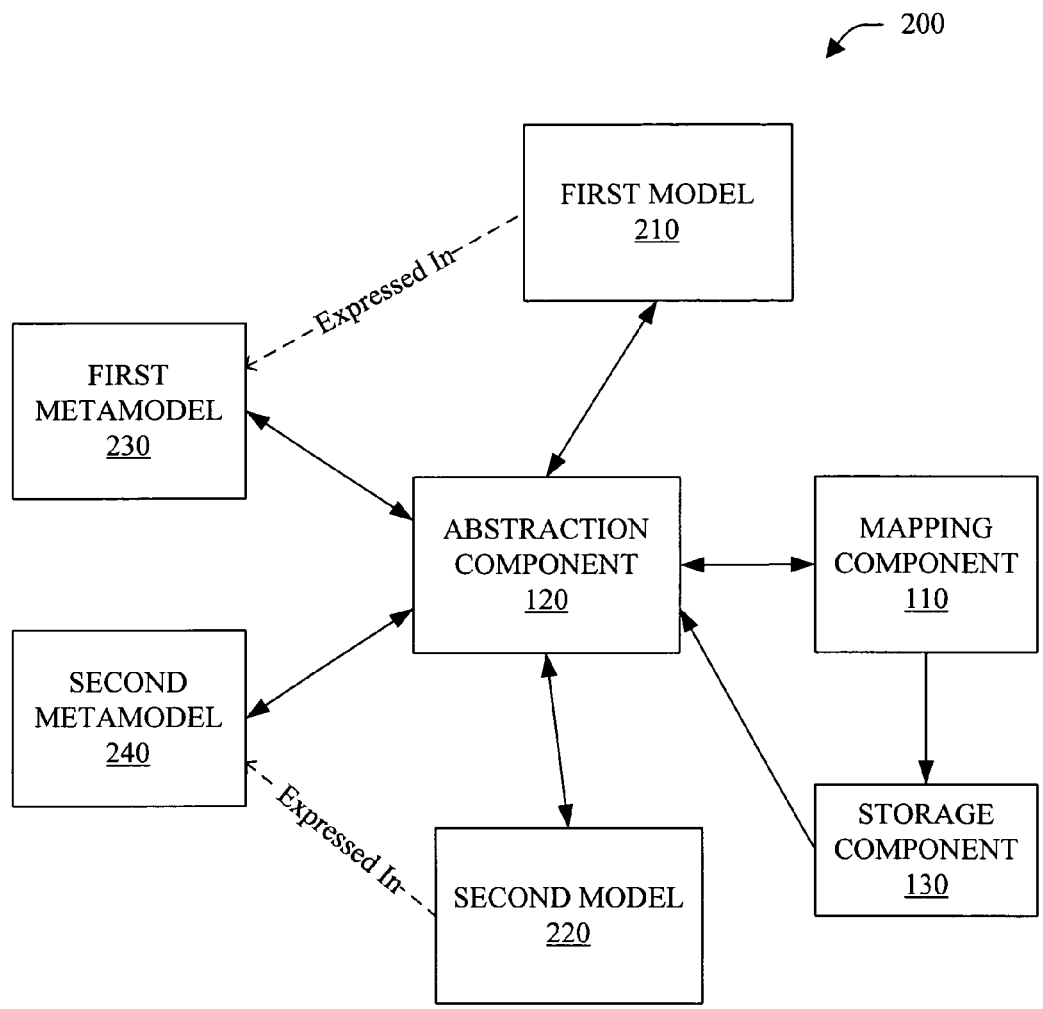
FIG. 2 is a block diagram of a data interaction system.

Referring to FIG. 1, a data interaction system 100 is illustrated. As depicted in FIG. 2, the system 100 can facilitate an executable, instance-level interaction between a source model 210 (e.g., schema) expressed in a first metamodel 230 (e.g., object-oriented metamodel) and a target model 220 expressed in a second metamodel 240 (e.g., SQL metamodel). Exemplary metamodels include, for example, SQL, XML, Entity Relationship (ER), C# interface, UML, IDL and object-oriented (OO) metamodels.

As noted previously, model translation can arise in many contexts. For example, it can be used to generate an implementation from a design (e.g., generate a SQL schema from an ER model and/or generate C# interface definitions from a UML model). Additionally, model translation can be used to generate a wrapper for a database (e.g., generate an XML or Object-oriented (OO) wrapper for a SQL schema) or a database that corresponds to a type definition (e.g., translate an XML or OO type definition into a SQL schema). Model translation can further be employed to translate an interface definition from one language to another (e.g., a Java interface to a C# interface). It is to be appreciated that there are many applications in which model translation can be employed and all such applications are intended to fall within the scope of the hereto appended claims.

Overall, generation of instance-level mappings by the system 100 comprises, in general, the following aspects:

Mappings are represented using a standard data transformation language;

Mappings are computed by composing the elementary data transformations produced upon eliminating each successive modeling construct; and Mappings are transformed into an executable, instance-level mapping (e.g., compiled into SQL views)

While the instance mappings described herein for each rule are expressed in a predicate calculus notation, it is well known by those skilled in the art that predicate calculus expressions can be translated into equivalent relational algebra expressions and vice versa. Therefore, the instance mappings described here in predicate calculus notation could be expressed in relational algebra notation instead. One way to do this is to rewrite the instance mapping in the final output of the schema translation process from predicate calculus into relational algebra. Another way is to rewrite the predicate calculus instance mapping associated with each transformation rule as a relational algebra instance mapping. In this case, when a transformation rule is applied, the relational algebra instance mappings associated with the transformation rules already applied are composed with the relational algebra instance mapping associated with the rule currently being applied. Accordingly, any type of instance mappings suitable for carrying out the claimed subject matter can be employed and all such types of instance mappings are intended to fall within the scope of the hereto appended claims.

The system 100 includes a mapping component 110 that generates a mapping between the source model 210 and the target model 220. The mapping can be employed, for example, to translate (1) data instances that conform to the first model into data instances that conform to the second model and/or (2) query(ies) posed against the first model into query(ies) posed against the second model. The mapping can be stored to a computer-readable medium by a storage component 130.

The system 100 further can, optionally, include an abstraction component 120 that employs the mapping to translate an instance-level data interaction operation of the source model 210 into an instance-level data interaction operation of the target model 220.

In order to map the source model 210 to the target model 220, the mapping component 110 employs a universal metamodel. The universal metamodel, also referred to as a supermetamodel, includes the main modeling constructs found in conventional metamodels (e.g., CLR, SQL and/or XSD). The universal metamodel is extensible, such that, as additional constructs are created, the universal metamodel can be extended to include these additional constructs.

By using a universal metamodel, transformations can be defined more generically. For example, the concepts of Entity in the ER model and Class in OO metamodels correspond to a single construct in the universal metamodel, called an Abstract. The concepts of Tuple in SQL and a Record in a delimited file correspond to the construct Structure in the universal metamodel. Therefore, a transformation from Abstract to Structure can be used to translate either an entity or class into a tuple or record. Thus, many fewer transformations are required than if transformations were specified for each source metamodel/target metamodel pair.

Generally, the translation process proceeds in three steps:

(1) Transform the source model 210 (e.g., source model) into the universal metamodel. S is the transformed source model 210 (e.g., source model).

(2) Execute transformation(s) that eliminate from S all modeling constructs (e.g., types) that are absent from the second metamodel 240 (e.g., target metamodel). S' is the output of this step.

(3) Transform S' into the second metamodel 240 (e.g., target metamodel). This is achievable as the previous step eliminated construct(s), if any, that could not be represented using the second metamodel (e.g., target metamodel).

The first and third steps are generally straightforward. Because the universal metamodel covers the modeling constructs of interest, these steps generally involve renaming types. In the first step, each modeling construct used in the source model 210 (e.g., source model), for example Class, is renamed to be the corresponding modeling construct in the universal metamodel (e.g., Abstract). The third step works in reverse.

The transformations in the second step can be expressed in a standard rule-based language (e.g., Datalog). The mapping component 110 can employ an algorithm for determining the exact sequence of transformations needed in the second step to eliminate from S modeling constructs, if any, absent from the second metamodel 240 (e.g., target metamodel). However, as discussed below, when the system is being used only for specific source and target metamodels, a user can manually specify the sequence of transformation rules to apply. The transformation rules can be expressed in any data manipulation language or programming language suitable for carrying out the claimed subject matter and all such types of transformation rules are intended to fall within the scope of the hereto appended claims.

The purpose of the second step is to translate source model 210 constructs into constructs that are available in the target metamodel 240. For example, when translating from the ER metamodel to the SQL metamodel, transformations are needed that replace entities by tables, attributes by columns, one-to-many relationships by foreign keys, many-to-many relationships by join tables, etc. Some transformations are irrelevant because they replace constructs that are not present in the source metamodel (and are therefore not used in the source model) or because they replace constructs present in both the source and target metamodels. Given the choice of source and target metamodels, the algorithm is able to select a series of transformations that replaces constructs present in the source metamodel by constructs present in the target metamodel. As noted previously and discussed in greater detail below, because the output of this algorithm is a sequence of transformations, its use can be circumvented by providing a sequence of transformations manually.

The execution of each transformation generates element-to-element mappings. After all transformations are executed, these mappings connect each element of the source model 210 into the element(s) of the target model 220 that were generated from it. The element-to-element mappings can be expressed as logic formulas that explain how data that conforms to the source model 210 should be transformed to populate instances of the target model 220. These logic formulas amount to a data translation program, which can be further translated into the mapping language of choice, such as XSLT, SQL etc.

In addition to translating source constructs into target constructs, each rule also includes functions that map the unique identifiers of source elements into unique identifiers of target elements—Skolem functions. Briefly, a Skolem function is a function that maps one or more input values (e.g., that can appear in a Datalog formula) into an output value. Each Skolem function is injective (i.e., distinct arguments are mapped to distinct values) and has unique range (i.e., set of output values) that is distinct from the range of any other Skolem function. Skolem functions are used in logic programming to avoid existentially quantified variables in a Datalog rule by creating an instance of the variable being existentially quantified. In the mapping component 110, Skolem functions are exploited for two independent purposes: (1) to generate unique identifiers of target schema elements, and (2) to generate unique data values in instance-level mappings.

At the end of the transformation process, these functions can be used to follow a path from each source element to the target element(s) that were generated from it. The transformation rules generate logic formulas that reference these Skolem functions. These formulas can be interpreted as a data translation program for transforming instances of the source model 210 into instances of the target model 220, or as a query-rewriting mechanism for translating queries expressed against the source model 210 into queries expressed against the target model 220.

The Universal Metamodel

Constructs

The universal metamodel is intended to support all of the constructs present in SQL, textbook ER diagrams, CLR classes, XML Schema, and RDF Schema. A schema is a collection of types, attributes, containments, generalizations, keys and inclusion dependencies. The universal metamodel supports type constructors (often represented as nodes in a schema graph), attributes (represented as directed edges), generalizations, key constraints, and inclusion dependencies.

Every data value is an instance of at least one type. Types are subdivided into complex types and simple types. A complex type is a record that can have one or more attributes, whereas a simple type can never have attributes. Complex types are further subdivided into abstract types and structured types. Abstract types exhibit object identity: two instances are the same if they represent the same real-world object. Two distinct instances can have identical values for all of their attributes. Structured types exhibit value equality: two instances are the same if they have the same values for all of their attributes (i.e., a structured type is an abstract type whose attributes necessarily constitute a key). In some metamodels (e.g., XML Schema and CLR) additional semantics are associated with the distinction between abstract and structured types (e.g., in CLR structured types are allocated on the stack and abstract types in the heap). Complex types are constructed by specifying a set of attributes: <a1, . . . ,an> for structured types and (a1, . . . ,an) for abstract types.

Simple types are subdivided into lexical types and collection types. Lexical types represent the built-in types present in the metamodels, such as integer and string. The lexical types are pre-determined (i.e., there is no type constructor). Collection types represent a grouping of some base type and are constructed by specifying this base type. Collections are divided into set types {T} and ordered list types [T]. For example, the basic relational model only supports sets of structured types, whose attributes are lexical types. The nested relational model also allows attributes to reference sets of structured types.

Attributes represent a relationship from a domain that is necessarily a complex type to a range of any type. Minimum and maximum cardinalities are associated with every attribute. For example, these can be restricted to the values Zero, One and N.

A containment indicates that a child type exists only within the context of its parent. Two instances of the child type are equal only if the standard rules for equality are met and they are contained in the same parent. For example, two tuples might have the same value for all attributes, but are distinct if they are nested within different parent tuples.

Generalizations can be used to indicate a superset/subset relationship between two abstract types. A generalization can be declared to be total, which means every instance of the more general type is an instance of one of the specialization types. A generalization can also be declared to be disjoint, which means the intersection of every two specializations is empty. In one example, for simplicity, union types and subclass relationships are not distinguished between.

Key constraints identify a set of attributes that uniquely identifies a complex type. Two instances of a complex type are the same if they agree on the values of these attributes. For attributes with a maximum cardinality of N, two instances agree on the value of that attribute if they agree on some value for that attribute (in keeping with the XML Schema definition of keys). If two attributes each reference a collection, those collections are equal if (and only if) they have the same set of values (and in the same order for lists).

In one example, it is assumed that every structured type has a single primary key. This is to simplify the transformation of an attribute that directly references a structured type into a set of lexical attributes that indirectly reference the structured type (using an inclusion dependency). The presence of a primary key makes key selection deterministic (e.g., which can be important for transformation rules expressed using Datalog).

Inside a container, keys are assumed to be local. This means that two objects with the same key values may be different if they have different parents. For example, an address (structured type) might be contained by both a person (abstract type) and a business (abstract type). If address-id is a local (primary) key for address, a business address and personal address that share an address-id are distinct instances.

Each key is associated with a complex type. The domain or range of every attribute in the key must be the associated complex type. If the domain of every attribute is the associated complex type, the key is internal. Otherwise, it is external. In one example, only internal keys are supported.

An inclusion dependency indicates that the values of a set of attributes (all with the same domain) are a subset of the values of some key. For example, this can be used to replace references to complex types by lexical attributes, although it can be directly declared in SQL as a foreign key.

The universal metamodel can be expressed, for example, as Datalog predicates. The constructs can be organized into a hierarchy and stored in a types file. In that file, the first field is used for layout, the second field names the type, the third field lists the parent type(s) and the fourth field describes the type as a Datalog predicate. This final field is used to generate inheritance rules (e.g., ComplexType:-AbstractType).

Within the universal metamodel, patterns can be defined. Each pattern represents a construct that may or may not appear in a given metamodel, and is expressed as a conjunctive query. These patterns are used to describe a metamodel and to annotate transformation rules to indicate their inputs and outputs.

A metamodel is a set of patterns. A transformation rule removes all instances of the input pattern and replaces it by the output pattern.

Semantics

In one example, instances of universal metamodel constructs are defined as described here. In this example, the existence of a finite set of lexical instances L is assumed. Further, the existence of a countably infinite set of object instances ID and a countably infinite set of edge labels F is assumed. These sets are disjoint. This differs from Resource Description Framework (RDF) in that edge labels are not drawn from the set of object instances.

A data instance is expressed as triples of the form $D:<D_L, D_{ID}, D_A>$ where $D_L \subseteq L$, $D_{ID} \subseteq ID$ and $D_A$ is a set of triples of the form $<x \in D_{ID}, \alpha \in F, \gamma \in D_{ID} \cup D_L>$. Thus, a data instance can be interpreted as an edge-labeled graph in which nodes are lexical and object instances and each edge links an object instance to a lexical or object instance.

A model is a (potentially infinite) set of data instances. For example, a model may be a CLR type definition or a SQL schema. A metamodel is a (potentially infinite) set of models (e.g., CLR or SQL themselves).

The universal metamodel is the set of all models that can be expressed as a triple of the form $<T,A,C>$ in which T is a set of types, A is a set of attributes and C is a set of constraints. An instance of such a model is a function I from $T \cup A$ to data instances, subject to the restrictions in C.

The lexical types partition L into discrete domains; these lexical types are shared across all models (and metamodels). An abstract type A defines a new set of instances: I(A) is a finite subset of ID. Collection types can also be allowed, which are declared with respect to some base type. For a given collection C(T), I(C) is a finite set of collections of instances of T. For example, List(integer) is a finite set of (ordered) lists of integers.

There is a special value (NULL), which is an instance of every type (i.e., $\forall T \in T$, $NULL \in I(T)$). For collection types, NULL represents an empty collection. Otherwise, NULL represents an empty instance (of an abstract type) or an empty value (for lexical types). This representation is in keeping with SQL and CLR, both of which support explicit NULL values.

Types are connected by attributes. An attribute ($F \in F$) is a total mapping from abstract type D to instances of type R:

$I(F) \subseteq <P_1 \times I(R) - NULL> \cup <P_2 \times NULL>$, where the following five conditions hold:

$P_1 \cup P_2 = I(D)$
$P_1 \cap P_2 = \emptyset$
$NULL \in P_2$
$Dom(I(F)) = I(D)$
$Range(I(F)) \subseteq I(R)$ The first three conditions guarantee that I(D) is partitioned into instances ($P_1$) that map to non-null values and instances ($P_2$) that map to NULL (and only NULL). The fourth condition says that the mapping is total; as a special case NULL is mapped to NULL. Finally, the fifth condition follows from $I(F) \subseteq <P_1 \times I(R) - NULL> \cup <P_2 \times NULL>$.

Additional restrictions can be placed on an attribute. If the minimum cardinality of an attribute is One, then $P_2 = \{NULL\}$, since every (real) element of I(D) is mapped to a non-null value. If the maximum cardinality is One, then F is a total function. When both the minimum and maximum cardinalities are One, F is a total function in the traditional sense (i.e., every element of I(D) is mapped to a single non-null element of I(R)).

The universal metamodel supports additional restrictions, such as inclusions and keys. The simplest inclusion is a generalization that relates one abstract type to a set of abstract types (called the specialization): G(X, S) indicates that type X is a generalization of the elements of S. This introduces the restriction that for every $S \in S$, $I(S) \subseteq I(X)$.

A key defined on T identifies a set of attributes that uniquely identifies an instance of T. K(T, A) indicates that type T is uniquely identified by the values mapped to by the members of A. The interpretation of a key is straight-forward when all of the elements of A have maximum cardinality of One. More generally, for any attribute $A \in A$ two instances of T, $t_1$ and $t_2$, agree on the value of A if there exists v such that $<t_1,v> \in I(A)$ and $<t_2,v> \in I(A)$. If K(T, A) and $t_1$ and $t_2$ agree on every $A \in A$, then $t_1 = t_2$.

As a convenience, abstract types and structured types can be distinguished. In the latter case, the set of all attributes defined on a structured type constitutes a key. This establishes value identity for all structured types, and object identity for abstract types.

Finally, an inclusion dependency imposes a restriction on a set of attributes: Inc(T,K,B) indicates that type T references the attributes of key K, using function B to relate the foreign key attributes of T to the attributes of K.

It is to be appreciated that a relation is not modeled as a cross-product of types, as is normally the case. In this universal metamodel, a relation is a structured type, and therefore an abstract type, whose instances are tuples. Attributes are used to relate the tuple object to its corresponding values. This allows one to transform abstract types into structured types (and vice versa). In this framework, NULL is a tuple whose attribute values are all NULL.

Transformation Rules

Syntax of Rules

A transformation rule is a logical expression that describes how to replace all instances of some pattern (or patterns) with instances of different patterns. For example, the following simple transformation rule replaces all instances of multi-value attributes (attributes whose maximum cardinality is N) by a single-value attribute that references a set of values:

```
ReplaceMultiValueAttrsWithCollections(_schema),
Attribute(_id, _name, _d, _r, _min, N, _schema),
Type(_r, _rName, _schema)
=>
Attribute(NewObject(_id), _name, _d, NewSet(_r),
    _min, One, _schema),
SetType(NewSet(_r), NewName(_rName), _r, _schema),
Map(_id, NewObject(_id)).
```

The body of the rule (the part before the arrow symbol =>) includes three predicates. The first predicate (ReplaceMultiValueAttrsWithCollections) is a flag that indicates that this transformation rule should be applied to the indicated model. The second predicate identifies the pattern to be replaced (Attribute(_, _, _, _, _, N, _)). This matches exactly the definition of Multi-value Attribute. The final predicate (Type) provides additional information needed for the rule to be processed. In this case, the name of the Type can be used to construct a name for a new Set.

The head of the rule (the part after the arrow symbol =>) also includes three predicates. The first two indicate new patterns that will be created (Attribute(_, _, _, NewSet(_r), _, One, _) and SetType(NewSet(_r), _, _r, _)). A special predicate in the head of the rule (Map) indicates which pattern will be replaced. Skolem functions NewObject, NewSet and NewName are used to indicate that the new attribute is derived from the old attribute. In the predicate Attribute, the original name, domain, and minimum cardinality are preserved. The range of the new attribute is a set of values, and the maximum cardinality is One. Similarly, in the predicate SetType, a new set is created, derived from the original range, with a new name. These new objects match the definition of Single-value Set Attribute.

Some assumptions are built into these expressions. First, for every predicate in the universal metamodel, the first argument is a unique object identifier (oid). Second, the Map predicate indicates that the first argument (oid) is to be replaced by the second argument (oid). Third, the Delete predicate indicates that its argument (oid) is to be deleted (not shown in the transformation rule above). By convention, the names of Skolem functions begin with New (e.g., NewF). The names of Skolem functions need to be globally unique (i.e., if NewF is used in one rule, NewF cannot be used in a different rule).

Instance Mappings

Some of the rules also provide instance mappings. These can also be encoded as Datalog formulas. There is a special predicate used to encode instance mappings, InstanceRule (ruleID, side, predicate, arg1, arg2), whose parameters are as follows:
  ruleID: a unique rule identifier
  side: Body or Head indicating whether this predicate is part of the body or head of the rule
  predicate: a type/attribute generated by a Skolem function
  arg1/2: the predicate's variables (arg2 is NULL for types)

These logical expressions can be composed to transform instances of the source model 210 into instances of the target model 220. For example, the rule that reifies an attribute (A:x→y) as a join table (A') converts every instance of that attribute into a new tuple (of type A') whose attributes (From and To) reference x and y:

$A(x,y) <=>$ $A'(f(x,y)), From(f(x,y), x), To(f(x,y), y)$

The above instance-level transformation is a backward view; it expresses the source element A in terms of the target elements A', From, and To. The corresponding forward view can be derived from it as $A'(z) <=> A(x, y), z = f(x,y)$ $From(z, x) <=> A(x, y), z = f(x,y)$ $To(z, y) <=> A(x, y), z = f(x,y)$ A Skolem function f is used to create a new tuple for the attribute instance linking x and y. However, a different Skolem function is needed for each attribute A that is converted into a join table A'. Thus, the instance transformation for the backward view is actually expressed as a second-order logical expression:

InstanceRule(NewRule(_id), Body, _id, X, Y) <=>

InstanceRule(NewRule(_id), Head, NewObject(_id),
    NewSkolem(_id, X, Y), NULL), InstanceRule(NewRule(_id), Head, NewFrom(_id),
    NewSkolem(_id, X, Y), X), InstanceRule(NewRule(_id), Head, NewTo(_id),
    NewSkolem(_id, X, Y), Y).

The first line encodes the body of the instance transformation. The remaining lines encode the head of the instance transformation. The schema transformation indicates that _id is mapped to NewObject(_id) and that id generates two new attributes: NewFrom(_id) and NewTo(_id). The function NewSkolem(_id, X, Y) constructs a new, unique Skolem function with arguments X and Y. Note that X and Y are intended to be variables, but are expressed here as symbols. If these rules were to be fed back into the Datalog engine, they would need to be turned into variables (e.g., _X).

Hereafter, local Skolem functions are abbreviated as Sk. Further, each InstanceRule of the form:

InstanceRule(ruleID, side, predicate, arg1, arg2)

can be abbreviated by either predicate[arg1, arg2] if arg2≠NULL or predicate[arg1] if arg2=NULL Constructing Mappings by Way of Composition The source schema $S_0$ represented in a universal metamodel is translated into the target schema $S_n$ by the mapping component 110 using a series of transformations. Each transformation takes as input the current snapshot $S_i$ of the schema and produces as output schema $S_{i+1}$ and the mapping $m_{i+1}$ between $S_i$ and $S_{i+1}$. The final mapping m between $S_0$ and $S_n$ is obtained by composing the intermediate mappings as $m = m_1 \circ m_2 \circ \ldots \circ m_n$.

In the case of schema translation, the fact that each mapping $m_i$ is given by a combination of two view definitions can be exploited. The forward view $f(m_i)$ defines $S_i$ as a view of $S_{i-1}$, whereas the backward view $b(m_i)$ defines $S_{i-1}$ as a view of $S_i$. Hence, m is given by views f(m) and b(m) such that $f(m) = f_1(m) \circ \ldots \circ f_n(m)$ and $b(m) = b_n(m) \circ \ldots \circ b_1(m)$. Views f(m) and b(m) are computed using standard view unfolding algorithms.

Figure 3:
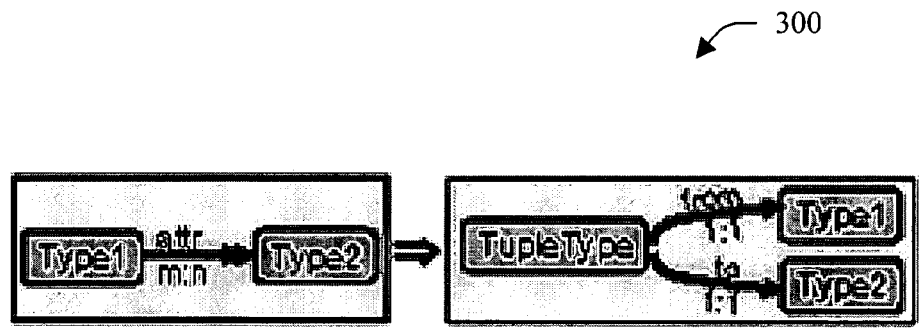
FIG. 3 is a block diagram of a transformation that eliminated m:n associations.

To illustrate the forward and backward views, consider FIG. 3 which shows schematically a transformation 300 that eliminates m:n-associations. In addition to modifying the schema, the transformation produces an intermediate instance mapping that expresses the new constructs Tuple-Type, from, and to in terms of attr, and vice versa.

Mapping composition "links dynamically" the above transformation with the ones that eliminate aggregation, inheritance, and other constructs absent, for example, from the relational model. The output mapping can be expressed in a neutral predicate calculus representation that can be compiled into a suitable language (e.g., SQL).

Example of Mapping Composition

Some of the instance transformations reference predicates that do not appear in the output. Ultimately, a mapping whose body contains only attributes and types from the source model and whose head contains only attributes and types from the target model is needed.

Whenever the head of a rule contains intermediate constructs, it needs to be unified with one or more rules that mention the intermediate construct in its body. Unification can be continued until the mapping only references attributes and types contained in either the source or the target. A final syntactic step is performed in which all attributes and types contained in the source are aggregated in the body and those from the target are aggregated in the head.

For example, consider a multi-valued attribute (A) from abstract type B to abstract type C. This is first converted into a join table. Ultimately, the references from A to B and C are replaced by foreign keys on oidB and oidC. The instance transformation contains three expressions:

$A(b,c)$<=>From$(a,b)$, To$(a,c)$

From$(a,b)$, oid$B(b,b')$<=>From'$(a,b')$

To$(a,c)$, oid$C(c,c')$<=>To'$(a,c')$

In this example, A is in the source model. From', To', oidB and oidC are in the target model, but From and To are not. The first expression can be unified with the second two to generate:

$A(b,c)$, oid$B(b,b')$, oid$C(c,c')$<=>From'$(a,b')$, To'$(a,c')$

A final rearrangement is needed so that A is expressed in terms of attributes in the target model:

$A(b,c)$<=>From'$(a,b')$, To'$(a,c')$, oid$B(b,b')$, oid$C(c,c')$

Rules

To increase comprehension, exemplary rules are described herein in the order in which they can be applied to transform CLR or MBF into SQL.

Replace Multi-value Attributes with Join Table

This transformation reifies every multi-value attribute as a new structured type containing two attributes (From and To). It assumes that the attribute is actually many-to-many. There are two strategies for dealing with one-to-many attributes. Either the To column can be made a primary key (i.e., each object can only be referenced once) or the attribute can be treated like a containment.

---

ReplaceMultiValueAttrsWithJoinTable(__schema),
Attribute(__id, __name, __domain, __range, __min, N, __schema)
=>
StructuredType(NewMV2JTObject(__id), __name, __schema),
Attribute(NewMV2JTFrom(__id), From,
NewMV2JTObject(__id), __domain,
   One, One, __schema),
Attribute(NewMV2JTTo(__id), To, NewMV2JTObject(__id), __range,
   __min, One, __schema),
Map(__id, NewMV2JTObject(__id)),
Delete(__id)

---

Thus, every attribute with maximum cardinality N is mapped to a join table with two new attributes. The minimum cardinality of the original attribute is preserved in the minimum cardinality of the To attribute. The original attribute is also deleted, which automatically removes dependent objects.

At the instance level, every attribute instance a that links values x and y is converted into a tuple in the join table (e.g., using a local Skolem function). Note that the original attribute related NULL to NULL; this information is now captured as a NULL tuple in the join table. If the attribute related x to NULL, this is explicitly stored in the join table.

_id(X, Y)<=>
NewMV2JTObject(_id)[NewSkolem(_id, X, Y)],
NewMV2JTFrom(_id)[NewSkolem(_id, X, Y), X],
NewMV2JTTo(_id)[NewSkolem(_id, X, Y), Y]

Replace Abstracts with Structured Types

This rule converts every abstract type into a structured type. (Recall that a structured type is an abstract type with value equality.) To preserve object equality, a new primary key is added to the structured type (an OID), provided a primary key did not already exist for the abstract type.

---

ReplaceAbstractsWithStructs(__schema),
AbstractType(__id, __name, __schema)
=>
StructuredType(NewA2SObject(__id), __name, __schema),
Map(__id, NewA2SObject(__id))
ReplaceAbstractsWithStructs(__schema),
AbstractType(__id, __name, __schema),
not KeyConstraint(__, __id, True, __schema)
=>
Attribute(NewA2SOID(__id), oid, NewA2SObject(__id),
   Int, One, One, __schema),
KeyConstraint(NewA2SKey(__id), NewA2SObject(__id), True, __schema),
KeyAttribute(NewA2SKeyAttr(__id), NewA2SKey(__id),
   NewA2SOID(__id), __schema),

---

At the instance level, every object is converted into a tuple. In many cases, a new object identifier is also created. The NULL object is mapped to the NULL tuple.

_id[X]<=>
NewA2SObject(_id)[X],
NewA2SOID(_id)[X, NewSkolem(_id, X)]

The last line, NewA2SOID(_id)[X, NewSkolem(_id, X)], applies only if the second transformation rule above was executed.

Remove Containment

This transformation removes containment by inverting the containment as an association from child to parent. For objects with multiple parents, multiple associations are created. Each new association is added to any existing key (i.e., the presence of a key is assumed). If at most one child can exist for each parent, then this inverse association is also a key.

---

RemoveContainment(__schema),
Containment(__id, __name, __parent, __child, __min, __max, __schema)
=>
Attribute(NewRCObject(__id), NewInverse(__name),
   __child, __parent, One, One, __schema),
Map(__id, NewRCObject(__id))
RemoveContainment(__schema),
Containment(__id, __name, __parent, __child, __min, __max, __schema),
KeyConstraint(__key, __child, __, __schema)
=>
KeyAttribute(NewRCKeyAttr(__id), __key, NewRCObject(__id),
   __schema)
RemoveContainment(__schema),
Containment(__id, __name, __parent, __child, __min, One, __schema)

-continued

```
=>
KeyConstraint(NewRCKey(_id), _child, False, _schema),
KeyAttribute(NewRCKeyAttr2(_id), NewRCKey(_id),
    NewRCObject(_id), _schema)
```

At the instance level, the relationship from parent to child is inverted. The semantics of the containment needs to be specified very carefully, because a given parent might contain no children (i.e., the containment might relate the parent to NULL). In this case, the inverse association (from NULL to an object) is not valid.

_id[X, Y]<=>
NewRCObject(_id)[Y, X]

Inline Tuple References

This transformation replaces every reference to a tuple by one or more lexical attributes that uniquely identify the tuple. If the referenced structure has a primary key, these attributes are used as a surrogate for the tuple. Otherwise, all of the attributes can be used. However, this expansion is recursive because the referenced type might itself reference a structured type. To simplify this expansion, we first introduce the notion of a defining attribute (where NoPrimaryKey is shorthand for a type without a primary key) using standard Datalog notation:

```
DefiningAttribute(_attr, _schema)
:- Attribute(_attr, _, _dom, _, _, _, _schema),
   NoPrimaryKey(_dom, _schema).
DefiningAttribute(_attr, _schema)
:- Attribute(_attr, _, _dom, _, _, _, _schema),
   KeyConstraint(_key, _dom, True, _schema),
   KeyAttribute(_, _key, _attr, _schema).
```

Based on this definition, DefiningAttributeStar (discussed below) is the transitive closure of DefiningAttribute. A defining lexical attribute can be recursively defined as either (1) the base case in which a defining attribute is lexical or (2) the recursive case in which a defining attribute references a type with a defining lexical attribute. For bookkeeping purposes, directly defined lexical attributes (case 1) are distinguished from indirectly defined lexical attributes (case 2). The base attribute that ultimately leads to the defining lexical attribute (so that inclusion dependencies can be updated if necessary) is further tracked. Finally, the overall minimum cardinality is preserved using the Min function.

```
DefiningLexicalAttribute(True, _attr, _attr, _name, _domain, _range,
    _min, One, _schema)
:- Attribute(_attr, _name, _domain, _range, _min, One, _schema),
DefiningAttribute(_attr, _domain, _schema),
LexicalType(_range, _, _schema).
DefiningLexicalAttribute(False, _base, _attr, _name, _domain,
    _range2, _fmin, One, _schema)
:- Attribute(_base, _, _domain, _range, _min1, One, _schema),
DefiningAttribute(_base, _domain, _schema),
DefiningLexicalAttribute(_, _, _attr, _name, _range, _range2,
    _min2, One, _schema),
Min(_min1, _min2, _fmin).
```

For example, consider three structured types: R, S and T. R references S using attribute a and has primary key k (an Int). S has no primary key, but it has two attributes b (an Int) and c (which references T). Finally, T has a primary key attribute d (an Int). The defining attribute for R is k, for S they are {b,c} and for T, d. Now to compute the defining lexical attributes: For type T, d is a directly defined lexical attribute. For type S, b is a directly defined lexical attribute and d is an indirectly defined lexical attribute (via c).

Given these definitions, a reference can be inlined to a structured type by replacing the attribute with a set of attributes, one for each defining lexical attribute in the referenced type. For example, a can be replaced by {b,d}, the defining lexical attributes of S.

If the referenced type has a primary key (block 2 below), then there is an inclusion dependency from the new attributes to that key. Similarly, if the reference itself participates in a key (block 3), that key is updated. Finally, this rule also deletes each referenced structure with no primary key (because its content has been in-lined and it is an unnecessary level of indirection):

```
InlineStructReferences(_schema),
Attribute(_id, _name, _domain, _range, _min1, One, _schema),
StructuredType(_range, _, _schema),
DefiningLexicalAttribute(_direct, _base, _attr, _aName, _range,
    _range2, _min2, One, _schema),
Min(_min1, _min2, _fmin)
=>
Attribute(NewISRObject(_id, _attr), NewISRName(_attr, _name,
    _aName), _domain, _range2, _fmin, One, _schema),
Map(_id, NewISRObject(_id, _attr))
InlineStructReferences(_schema),
Attribute(_id, _, _, _domain, _range, _, One, _schema),
StructuredType(_range, _, _schema),
KeyConstraint(_key, _range, True, _schema),
DefiningLexicalAttribute(_direct, _base, _attr, _, _range, _, _,
One, _schema)
=>
InclusionDependency(NewISRInc(_id), _domain, _key, _schema),
InclusionAttribute(NewISRIncAttr(_id, _attr), NewISRInc(_id),
    NewISRObject(_id, _attr), _direct ? _attr : NewISRObject(_base,
    _attr), _schema).
InlineStructReferences(_schema),
Attribute(_id, _, _, _range, _, One, _schema),
KeyAttribute(_keyAttr, _key, _id, _schema),
StructuredType(_range, _, _schema),
DefiningLexicalAttribute(_, _, _attr, _, _range, _, _, _, _schema)
=>
KeyAttribute(NewISRKeyAttr(_keyAttr, _attr), _key,
    NewISRAttr(_id, _attr), _schema),
Map(_keyAttr, NewISRKeyAttr(_keyAttr, _attr)).
InlineStructReferences(_schema),
Attribute(_id, _, _, _range, _, One, _schema),
StructuredType(_range, _, _schema),
NoPrimaryKey(_range, _schema)
Delete(_range).
```

Note that when an inclusion dependency is created, it is expressed against the referenced type, not necessarily against the defining lexical attribute. In some cases, this requires constructing the inclusion dependency against a new attribute (for example, R.d references S.d, which was an indirectly defined lexical attribute). This motivates the conditional operator in the second block.

At the instance level, the chain of functional attributes is collapsed by projecting out all of the intermediate tuples. The final attribute maps the source tuple to a lexical value. The set of these values serves as a surrogate for the referenced tuple:

_id[X, Y],
_attr[Y, Z]
<=>
NewISRObject(_id, _attr)[X, Z].

Note that the second half of the body generates one atom for every attribute in the transitive closure of the defining attributes (using DefiningAttributeStar in the second block).

The head has one atom for every defining lexical attribute. For example, this expression relates attributes a-d to the new attributes on R: ab and acd:

$$a(R,S), b(S,B), c(S,T), d(T,D) <=> ab(R,B), acd(R,D)$$

Additional Rules

Additional transformations include, for example:

Replace Multi-value Attributes with Sets

This transformation replaces every attribute with a maximum cardinality of N by a single-valued attribute that references a set (i.e., A:D→R becomes A:D→{R}). This changes the semantics in that some key constraints might become less stringent (i.e., easier to satisfy). Recall that two instances agree on an attribute if they agree on any value of that attribute. Two sets are equal only if they contain the same elements. Thus, there are fewer cases in which it can be inferred that two objects are the same.

Replace Lists with Sets of Indexed Structs

This transformation replaces all list types by a set. Because sets are unordered, a layer of indirection (via a structured type) is added. The new structured type has a list identifier and an index into that list, which serve as a primary key (i.e., [T] becomes {<ID: Int, Index: Int, Value: T>}.

Other Transformations

Reify Set Attributes: This transformation replaces every attribute that references a set by a join table. This transformation is exactly analogous to the transformation that transforms multi-valued attributes into a join table.

Add Attribute to Empty Struct: This transformation adds an attribute to every structured type that has no attributes (e.g., because SQL does not permit a relation with no columns). The range of the new attribute is NULL (i.e., if E is the empty struct, A:E→NULL).

Stratify Sets: This rule replaces every set of sets (i.e., {{T}}) by a set of structured types (i.e., an instance of the nested relational model: {<ID: Int, Value: {T}>}). The new structured type has a primary key, ID, that uniquely identifies the nested set and a reference to the value. This rule can be employed with the nested relational model.

Remove Generalizations: Generalizations are replaced by structured types using an inheritance mapping component 400.

Inheritance Mapping

Figure 4:
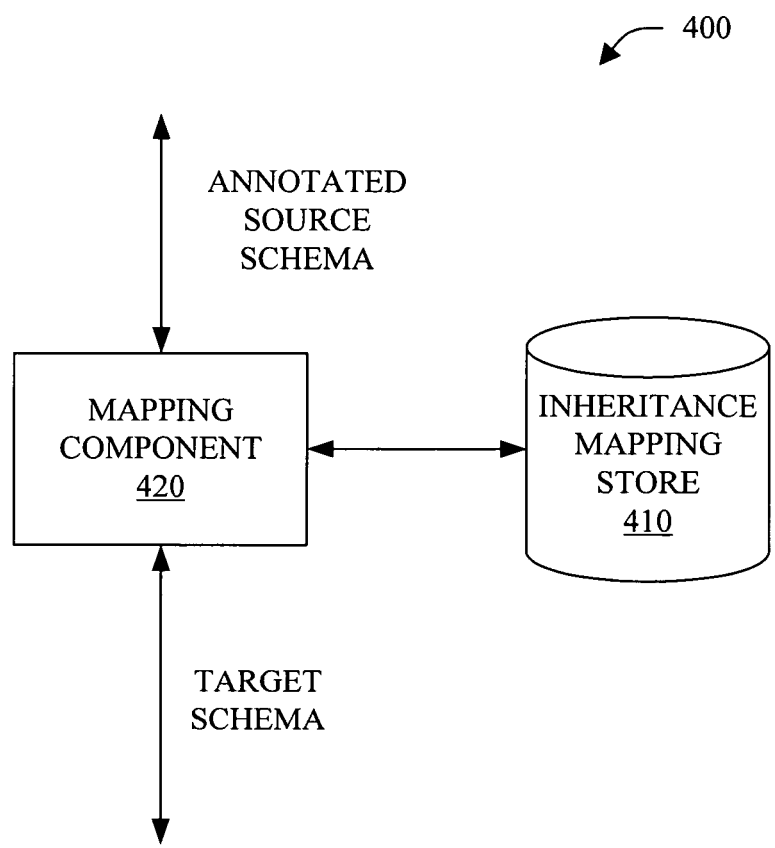
FIG. 4 is a block diagram of a data interaction system.

Referring next to FIG. 4, a data interaction system 400 is illustrated. The system 400 can employ a mechanism for mapping inheritance hierarchies to relations. The mechanism can, for example, be employed as one of the transformations employed by the system 100. As discussed below, the choice of inheritance mapping strategy(ies) in representing objects as relations can be user-selectable.

The system 400 can employ an approach for capturing inheritance mapping strategies that subsumes and generalizes standard techniques. Essentially, it allows the user (e.g., engineer) to decide on a quantity of relations used for representing a subclass hierarchy, and to assign each direct or inherited property of a class independently to any relation. The system 400 allows choosing an inheritance mapping strategy on a per-class basis, and supports any combination of the known horizontal/vertical/flat strategies.

The system 400 includes an inheritance mapping store 410 (e.g., mapping table) that stores information regarding a target relation for each direct or inherited attribute of each type of a type hierarchy (e.g., describes how class property(ies) are mapped to relation attributes). The system 400 further includes a mapping component 420 that stores information in the inheritance mapping data store based, at least in part, on information received from a user (e.g., engineer) regarding a quantity of relations used for representing the type hierarchy.

Known approaches to dealing with inheritance include:

Vertical inheritance (e.g., "one class one table", or "one table per type", or "class table inheritance")

Horizontal inheritance (e.g., "one inheritance path one table", "one table per concrete type", "one table per leaf", "concrete table inheritance")

Flat inheritance (e.g., "one inheritance tree one table", "one table per multiple types in hierarchy", "single table inheritance", "filtered mapping", "union inheritance")

The system 400 provides a mechanism that subsumes all known inheritance mapping strategies and provides a complete coverage of possible mapping options. The choice of the inheritance mapping strategy can be influenced, for example, by the following factors:

Performance of queries and CRUD operations

Legacy support

Maintenance upon schema evolution

Storage space

Physical distribution and partitioning of data

Code transparency/programmability

The flexibility offered by the system 400 allows dynamic tuning, for example, selecting the most efficient storage representation for a given query workload.

The generated views are inverses of each other. Accordingly, the system 400 supports lossless bi-directional transference of data from objects to relations and back. Additionally, since output views are defined both ways, mapping composition can be used to generate mappings to migrate one version of the relational schema to the next version of the relational schema.

An annotated source schema is provided to the mapping component 420. The mapping component 420 provides a target schema and two view definitions as an output.

The schemas can be represented using a common metamodel. For purposes of explanation, the following naming convention is adapted herein: the types in the source schema are referred to as classes; their attributes are called properties. The types in the target schema are referred to as relations. Class properties and relation attributes are considered functions that map, respectively, objects or tuples to atomic values.

Classes in the source schema are arranged in an inheritance hierarchy (a partial order on classes). No associations (e.g., class-valued properties) are allowed in this example—it is assumed that associations were eliminated by other transformation rules. Each class has a designated primary key.

The Inheritance Mapping Store 410

Figure 5:
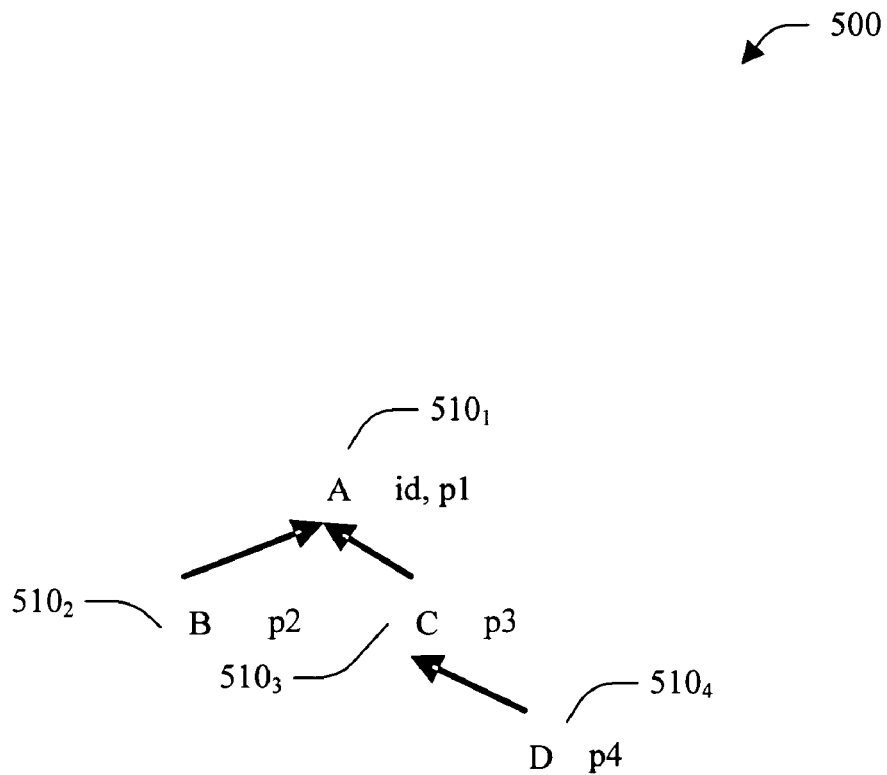
FIG. 5 is a diagram of a sample source schema.

Mapping generation is driven by a conceptual structure that describes how the properties of classes map to relation attributes—an inheritance mapping store 410 (e.g., mapping table). Referring to FIG. 5, a sample source schema 500 is illustrated. The schema 500 contains four classes 510, each defining one or more properties. "A" $510_1$ is an abstract class, A.id is its key. Inherited properties (e.g. property p1 on D $510_4$) are not shown.

A corresponding exemplary inheritance mapping store 410 (e.g., mapping table) is depicted below. In this example, rows correspond to classes, the columns correspond to relations—the two rightmost columns are for informative purposes only:

TABLE 1

| $R^{flag}$ | S | T | Sig(.) | prop*(.) |
|---|---|---|---|---|
| B  id, p1 | id, p2 |        | 110 ≅ {R, S}    | id, p1, p2 |
| C  id, p1 |        | id, p3 | 101 ≅ {R, T}    | id, p1, p3 |
| D  id, p3 | id, p1 | id, p4 | 111 ≅ {R, S, T} | id, p1, p3, p4 |

The table summarizes in which relations the (direct or inherited) properties of concrete classes are stored. There is no row for A, since A is an abstract class. For example, the C row indicates that each object of type C is stored as two tuples, an R-tuple holding the derived properties id and p1, and a T-tuple holding p3 and the derived property id.

The rightmost column shows direct or inherited properties of the respective class. To ensure complete and non-redundant coverage, each property of each class is placed in exactly one cell of the respective row, unless the property is part of the primary key. Properties that are part of the primary key are repeated in each non-empty row cell, so that the relations corresponding to each class have a common join key (simple or compound).

The column labeled "Sig(.)" lists the "signatures" of each class. A signature is a set of relations used by the class, or, alternatively, a bit vector that describes which relations are used for storing the properties of the class. The objects can be reconstructed from tuples unambiguously when all signatures are different. Thus, C differs from D in that no part of it is stored in S. Thus, to reconstruct objects of type C, R-tuples and T-tuples can be joined such that there are no joining S-tuples.

Table 1 corresponds to the following target schema:
R(id, p1, p3, Flag)
S(id, p1, p2)
T(id, p3, p4)

In this example, an extra attribute Flag is added to R since R is marked as "flagged" in the header of Table 1. The flag attribute stores the type of the object that this tuple originates from (as a string or integer ID). The use of flag attributes is described below.

Formal Notation

In order to describe inheritance mapping, the following notation will be employed:

Let M denote an inheritance table
M[c,r] is the set of properties in the cell that corresponds to class c and relation r.
PK(c) is the set of (direct or inherited) properties that form a primary key on c.
prop*(c) is the set of (direct or inherited) properties of class c.
RSig(c)={r|M[c,r]≠∅} is the set of relations in which parts of c get stored
CSig(r)={c|M[c,r]≠∅} is the set of classes that store their data in r
Flagged is the set of relations containing a flag attribute
TypeID(c) is the type identifier stored in flag attributes
With respect to the information set forth in Table 1 above:
M[C, T]={A.id, C.p3}
PK(C)={A.id}
prop*(C)={A.id, A.p1, C.p3}
RSig(C)={R, T}
CSig(S)={B, D}
Flagged={R}
TypeID(C)="C"

In this example, an inheritance mapping store 410 (e.g., mapping table) is identified as valid if it satisfies the following conditions:
1. Coverage condition: $\cup_r M[c,r]prop*(c)$
2. Key condition: if $r \in RSig(c)$, then $PK(c) \subseteq M[c,r]$
3. Invertibility: for each pair of classes $c_1 \neq c_2$: if $RSig(c_1) \subseteq RSig(c_2)$ then $RSig(c_1) \subseteq$ Flagged or $RSig(c_1) \neq RSig(c_2)$ A valid inheritance mapping store 410 (e.g., mapping table) may yield view definitions containing negation (e.g., "NOT" exists). Typically, negation requires an extra join and is less efficient. If negation is not desired, the inheritance mapping store 410 (e.g., mapping table) must satisfy the following additional condition:

Negation-free: for each pair of classes $c_1 \neq c_2$:
if $RSig(c_1) \subseteq RSig(c_2)$ then $RSig(c_1) \subseteq$ Flagged In view definitions, the following predicates can be employed:
c(x): holds whenever x is a direct instance of class c, i.e., type of x is c
c*(x): holds whenever x is an instance of c or any class derived from c
c.p(x,y): holds whenever c(x) holds and y is the value of the (direct or inherited) property p of x
c*.p(x,y): holds whenever c*(x) holds and y is the value of the (direct or inherited) property p of x
r(x): holds whenever x is a tuple in r
r.p(x,y): holds whenever x is a tuple in r and y is the value of attribute p of x.

In this example, the terms "instance" and "tuple" are used synonymously with instance identifier and tuple identifier, respectively. Instance and tuple identifiers need not be disjoint.

Mapping Generation

For each assignment of the cells of the inheritance mapping store 410 (e.g., mapping table), two views are generated, called a forward view and a backward view. The forward view defines relations as a view on classes, and the backward view defines classes as a view on relations.

Backward Views

Continuing with the example discussed above, the instances of C can be reconstructed using the view:

$$C(x) \Leftrightarrow R(x) \& \sim S(x) \& T(x)$$

The negation in the above expression corresponds to using the NOT EXISTS clause in SQL. If relation R stores a flag that explicitly tags the tuple origin, C can be obtained as:

$$C(x) \Leftrightarrow R.Flag(x, \text{"C"})$$

For purposes of explanation, negation-free inheritance mapping stores 410 (e.g., mapping tables) are discussed hereinafter. The backward views defining the properties of C are obtained as follows:

$$C.id(x, y) \Leftrightarrow R.Flag(x, \text{"C"}) \& R.id(x, y)$$

$$C.p1(x, y) \Leftrightarrow R.Flag(x, \text{"C"}) \& R.p1(x, y)$$

$$C.p3(x, y) \Leftrightarrow R.Flag(x, \text{"C"}) \& T.p3(x, y)$$

As D inherits from C, the views for C*, id, C*.p1 and C*.p3 can be obtained using D.id, D.p1 and D.p3. For example:

$$C*.p1(x, y) \Leftrightarrow C.p1(x,y) | D.p1(x,y)$$

$$D.p1(x, y) \Leftrightarrow R.Flag(x, \text{"D"}) \& S.p1(x, y)$$

Hence:

$C^*.p1(x, y) \Leftarrow (R.Flag(x, \text{``C''}) \& S.p1(x, y)) | (R.Flag(x, \text{``D''}) \& S.p1(x, y)) \Leftarrow R.Flag(x, t), t \in \{\text{``C''}, \text{``D''}\}, S.p1(x, y)$ The backward views can be computed using the following procedures:

Generate BView(c):

Let $r :=$ any relation from $RSig(c) \cap \text{Flagged}$;

$BView(c) := r.Flag(x, TypeID(c)) \text{ AND } t = TypeID(c)$

Generate BView(c.p):

Find some $r \in RSig(c)$ such that $p \in M[c, r]$ /* always exists by the coverage condition */

$BView(c.p) := BView(c) \text{ AND } r.p(x, y)$

Generate BView(c*):

$BView(c^*) := OR_{c'=c \text{ or } c' \text{ is subclass of } c}(BView(c'))$

Generate BView(c*.p):

$BView(c^*.p) := OR_{c'=c \text{ or } c' \text{ is subclass of } c}(BView(c'.p))$ The clause t=TypeID(c) generated in BView(c) ensures that the object type information is obtained whenever an object property is fetched from the relations.

Forward Views

Continuing with this example, the forward view for relation R is obtained as follows:

$R(x) \Leftrightarrow B(x) | C(x) | D(x)$ $R.Flag(x, t) \Leftrightarrow (B(x) \& t = \text{``B''}) | (C(x) \& t = \text{``C''}) | (D(x) \& t = \text{``D''})$ $R.id(x, y) \Leftrightarrow B.id(x, y) | C.id(x, y) | D.id(x, y)$ $R.p1(x, y) \Leftrightarrow B.p1(x, y) | C.p1(x, y)$ $R.p3(x, y) \Leftrightarrow D.p3(x, y)$ The first line indicates that R-tuples originate from B-objects or C-objects or D-objects. The second line indicates how to set the flag attribute value. The fourth line specifies that p1-values of all tuples stored in R are obtained from p1-values of B-objects and C-objects.

The forward views can be computed using the following procedures:

Generate FView(r):

$FView(r) := OR_{c \in CSig(r)}(c(x))$

Generate FView(r.Flag):

$FView(r.Flag) := OR_{c \in CSig(r)}(c(x) \text{ AND } t = TypeID(c))$

Generate FView(r.p):

$FView(r.p) := OR_{c \text{ such that } p \in M[c, r]}(c.p(x, y))$

Inclusion Dependencies

Inclusion dependencies capture foreign key constraints on the target schema. For the sample inheritance mapping store 410 (e.g., mapping table), the following inclusion dependencies can be obtained:

$S.id(x, y) \rightarrow R.id(x, y)$ $T.id(x, y) \rightarrow R.id(x, y)$

In general, let t.p be an attribute of t. If the following condition holds:

for all c: $p \in M[c, t]$ implies $p \in M[c, r]$ then the following inclusion dependency is generated:

$t.p(x, y) \rightarrow r.p(x, y)$

Logical Optimization

Some clauses appearing in views may be redundant and, optionally, can be eliminated. In addition to the inclusion dependencies, the following rules can be used to support view optimization:

1. For all classes c:

$c.p(x,y) \rightarrow c(x)$

2. For any $r \in RSig(c) \cap \text{Flagged}$, $s \in RSig(c)$:

$r.Flag(x, \text{``C''}) \rightarrow s(x)$

3. If for some class c there is no c' such that $RSig(c) \subseteq RSig(c')$, then for any $r \in RSig(c) \cap \text{Flagged}$:

$AND_{r \in RSig(c)}(r(x)) \rightarrow r.Flag(x, \text{``C''})$

For example, the backward view that populates D-objects can be constructed as:

$R.Flag(x, \text{``D''}) \& t = \text{``D''} \& R.id(x, y) \& R.p3(x, y3) \& S.id(x, y) \& S.p1(x, y1) \& T.id(x, y) \& T.p4(x, y4)$ By the above rules, this view entails R(x), S(x), T(x) whose conjunction entails R.Flag(x, "D"). That is, R.Flag(x, "D") is redundant and can be eliminated.

Expressing Known Strategies Using Inheritance Mapping Stores 410

The known inheritance mapping strategies can be expressed using inheritance mapping stores 410 (e.g., mapping tables) as follows (using the sample source schema described above).

Vertical Inheritance:

TABLE 2

| $R^{flag}$ | S | T | U | RSig(.) | prop*(.) |
|---|---|---|---|---|---|
| B | id, p1 | id, p2 | | 1100 ≅ {R, S} | id, p1, p2 |
| C | id, p1 | | id, p3 | 1010 ≅ {R, T} | id, p1, p3 |
| D | id, p1 | | id, p3 | id, p4 1011 ≅ {R, T, U} | id, p1, p3, p4 |

Horizontal Inheritance:

TABLE 3

| R | S | T | RSig(.) | prop*(.) |
|---|---|---|---|---|
| B | id, p1, p2 | | | 100 ≅ {R} | id, p1, p2 |
| C | | id, p1, p3 | | 010 ≅ {S} | id, p1, p3 |
| D | | | id, p1, p3, p4 | 001 ≅ {T} | id, p1, p3, p4 |

Flat Inheritance:

TABLE 4

| $R^{flag}$ | RSig(.) | prop*(.) |
|---|---|---|
| B | id, p1, p2 | 1 ≅ {R} | id, p1, p2 |
| C | id, p1, p3 | 1 ≅ {R} | id, p1, p3 |
| D | id, p1, p3, p4 | 1 ≅ {R} | id, p1, p3, p4 |

Generating Mapping Tables from Class Annotations

As noted previously, the system 400 receives an annotated source schema as an input with the annotations being employed by the mapping component 420 to populate the inheritance mapping store 410 (e.g., mapping table). In one example, each class of the source schema can be annotated to use one of three strategies, for example, "Own", "All", or "None".

In this example, "own" performs vertical partitioning, the default strategy: each inherited property is stored in the relation associated with the ancestor class that defines it. "All" yields horizontal partitioning: the direct instances of the class are stored in one relation, which contains all of its inherited properties. "None" means that no relation is created: the data is stored in the inheritance mapping store 410 (e.g., mapping table) for the parent class.

Continuing with this example, the strategy selection propagates down the inheritance hierarchy, unless overridden by another strategy in descendant classes. These annotations exploit the flexibility of the inheritance mapping stores 410 (e.g., mapping tables) only partially, yet are easy to communicate to the engineers.

Let strategy(c) denote the strategy choice for class c. Then, for a given annotated schema, the inheritance mapping store 410 (e.g., mapping table) can be generated as follows:

```
Procedure PopulateMappingTable(c: class, r: target relation)
if (strategy(c) ∈ {"All", "Own"}) ||
    (c has properties beyond inherited keys) then
        r = CreateNewRelation;
if (strategy(c) ∈ {"All", "Own"}) &&
    (c has a child c' such that strategy(c') ∈ {"All", "Own"}) then
        Flagged := Flagged ∪ {r};
foreach direct or inherited property p of c:
    if (strategy(c) ∈ {"Own", "None"} &&
        (c has inherited keys only || p is inherited but not an inherited key)
then
        r = find an existing relation to accommodate p by inspecting the
            target relations of superclasses of c;
        // add an entry to the mapping table
        M[c, r] := p;
for each child c' of c:
    PopulateMappingTable(c', r);
End
```

In this example, the root class(es) are annotated as "All" or "Own". The above procedure can be called for every root class c as PopulateMappingTable(c, undefined).

Translating Backward Views into SQL

The procedure BView(.) yields view definitions that express the direct or inherited instances of some class and its properties in terms of relations. These views correspond to conjunctive queries with union (e.g., Select-Project-Join-Union (SPJU) views). Translation of logic-based SPJU views into SQL views is well-known in the art.

The complete class definitions can be turned into SQL, for example, as follows. Let p1, ..., pN be (direct or inherited) properties of class c. Then, the direct instances of c can be reconstructed using the following query:

$$c(x) \,\&^{\rightarrow} c.p1(x, y1) \,\&^{\rightarrow} c.p2(x, y2) \ldots \&^{\rightarrow} c.pN(x, yN)$$

where $\&^{\rightarrow}$ denotes the left outer join operator.

This query can be rewritten in terms of the relational schema as follows:

$$BView(c) \,\&^{\rightarrow} rename(y|y1, BView(c.p1)) \,\&^{\rightarrow} \ldots rename(y|yN, BView(c.pN))$$

Here, rename(var1|var2, expr) returns a copy of expression expr in which occurrences of var1 are replaced by var2.

Finally, the above rewriting can be translated into SQL by replacing $\&^{\rightarrow}$ with LEFT OUTER JOIN, AND by equijoins, OR by unions etc. To obtain views that expose direct or inherited instances, c is replaced by c* above.

EXAMPLE

To illustrate variations in mapping strategies, consider Tables 4 and 5 below which provide two alternatives for mapping the class hierarchy rooted at Account into two relations:

TABLE 4

| Entity | Account* | BusinessAccount |
|---|---|---|
| Account | {AccountNo, APR, AnnualFee} | |
| PersonalAccount | {AccountNo, APR, AnnualFee} | |
| BusinessAccount | {AccountNo, APR, AnnualFee} | {AccountNo, CompanyName, CompanyAddr} |

TABLE 5

| Entity | Account* | BusinessAccount |
|---|---|---|
| Account | {AccountNo, APR, AnnualFee} | |
| PersonalAccount | {AccountNo, APR, AnnualFee} | |
| BusinessAccount | | {AccountNo, APR, AnnualFee, CompanyName, CompanyAddr} |

For example, the last row of Table 4 indicates how the objects of type BusinessAccount are persisted: APR and AnnualFee are stored in relation Account only, CompanyName and CompanyAddr are stored in relation BusinessAccount only, and AccountNo is stored in both relations. To reconstruct the objects, the two relations are joined. The second column of Table 4 indicates how to populate the relation Account: we take a union of the objects of types Account, PersonalAccount, and BusinessAccount. The star in Account* indicates that the relation needs to have a flag attribute (EType) to disambiguate the origin of the tuples.

The known inheritance mapping strategies and their combinations are supported by varying the number of the target relations and populating the cells of the table in various ways. The only requirement for populating the cells is that the union of the properties listed in each row covers all direct and inherited properties of the respective class.

Figure 6:
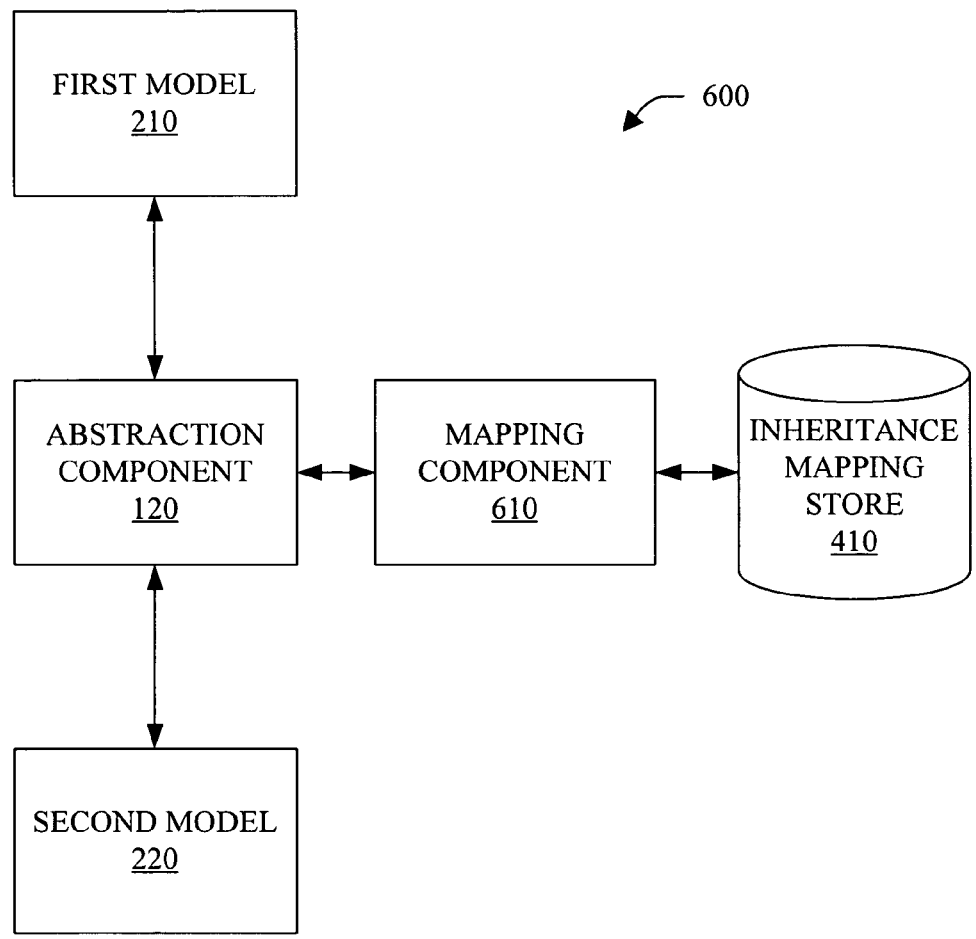
FIG. 6 is a block diagram of a data interaction system.

Next, referring to FIG. 6, a data interaction system 600 is illustrated. The system 600 includes a mapping component 610 that generates a mapping between a first model expressed in a first metamodel and a second model expressed in a second metamodel. The system 600 further includes an inheritance mapping data store 410 that stores information regarding a target relation for each direct or inherited attribute of each type of a type hierarchy. The mapping component 610 can store information in the inheritance mapping data store based, at least in part, on information received from a user regarding a quantity of relations used for representing the type hierarchy, as discussed above with respect to the mapping component 420.

The system 600 further includes an abstraction component 120 that employs the mapping to translate an instance-level data interaction operation of a source model 210 into an instance-level data interaction operation of a target model 220.

Figure 7:
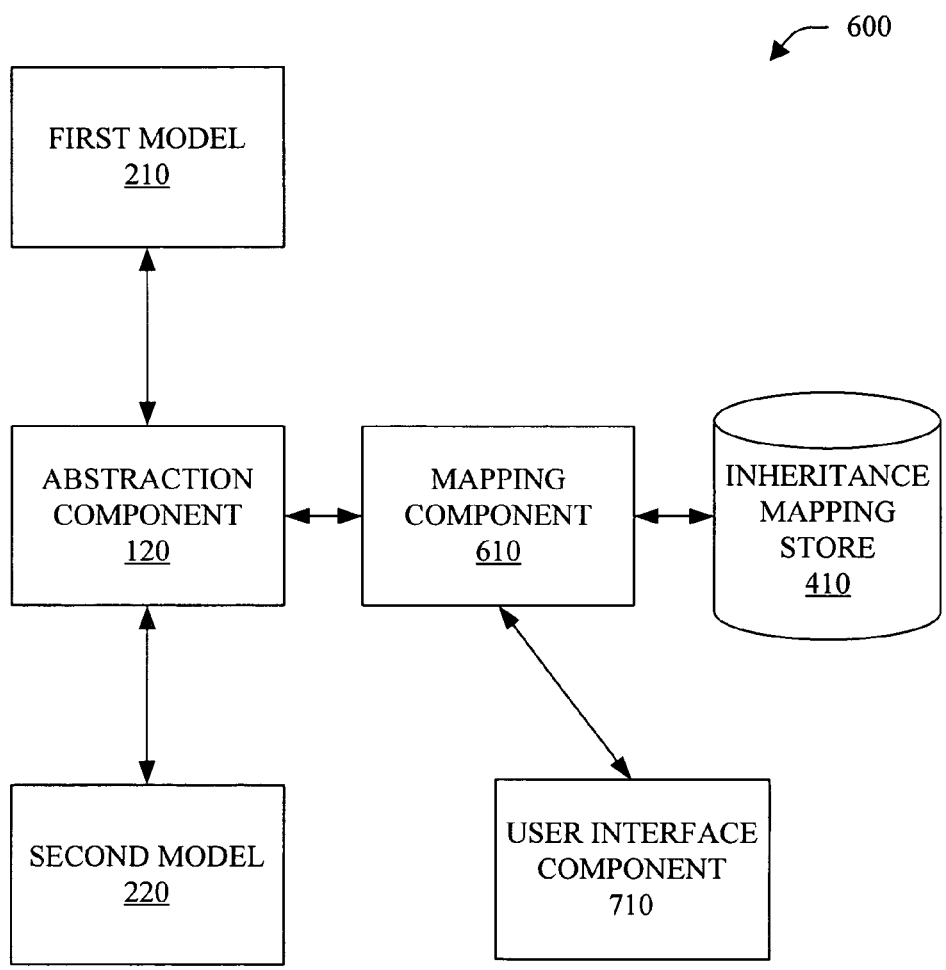
FIG. 7 is a block diagram of a data interaction system.

As illustrated in FIG. 7, the system 600 can further, optionally, include a user interface component 710 that facilitates interactive editing, for example, incremental modification of the source schema. Optionally, the user interface component 710 can facilitate annotations of the source schema for inheritance mapping strategy(ies) as discussed above.

Interactive Schema Translation

Developing an object-to-relational mapping can be an interactive process, during which the source schema undergoes revisions, and various mapping options are explored, such as choosing a horizontal or vertical strategy for mapping inheritance. Typically, a user (e.g., a database designer) desires to immediately view how his/her design choices affect the target schema and the generated views.

To improve the user experience in such scenarios, in one example, the system abstraction component 120 can translate schemas in a stateful fashion: the target schema is updated incrementally instead of being re-created upon each modification. For example, the mapping component 110 can cache generated elements. In particular, the graphical layout of the target schema is preserved during editing of the source schema.

Let $S_0$ be a source schema and let $S_1, \ldots, S_n$ be a series of target schema snapshots obtained by a successive application of individual schema transformations, as described above. Each transformation is a function that may add or delete some schema elements. Let $f_i$ be a function that returns new elements in $S_{i+1}$ given the old ones in $S_i$. The function is implemented in such a way that whenever the same schema elements are passed as input, the same outputs are produced, that is, the function is stateful (and is also referred to as a Skolem function). It can be observed that successive invocation of a series of such functions $f_1, \ldots, f_n$ preserves this property. That is, re-running the entire series of transformations on $S_0$ yields precisely the same $S_n$ as in the previous run, as the functions in effect cache all generated schema elements. Now suppose the user modifies $S_0$ producing $S_0'$. When $S_0'$ is translated into a target schema, the same sequence of transformations is executed on the unchanged objects. In this way, no new objects in the target schema are created for the unchanged objects in the source schema—previously created objects are re-used and only their properties are updated. For example, renaming an attribute in the source schema causes renaming of some target schema elements (e.g., attribute or type names); no new target objects are created.

While this mechanism covers incremental updates upon adding new elements to $S_0$, deletion can be addressed as follows. Let $S_n$ be the schema generated from $S_0$. Before applying the transformations to $S_0'$, a shallow copy $S_{copy}$ of $S_n$ can be created which identifies all of the objects in $S_n$. All transformations are re-run on $S_0'$ to produce $S_n'$. If an element gets deleted from $S_0$ when creating $S_0'$, then some elements previously present in $S_{copy}$ might not appear in $S_n'$. These target elements that are no longer present can be identified by comparing $S_{copy}$ to $S_n'$. They are marked as "deleted", but are not physically disposed of. If they appear in $S_n$ at some later run, the elements are resurrected by removing the "deleted" marker. Thus, the properties of generated objects are preserved upon deletion and resurrection.

Example of Schema Translation

Figure 8:
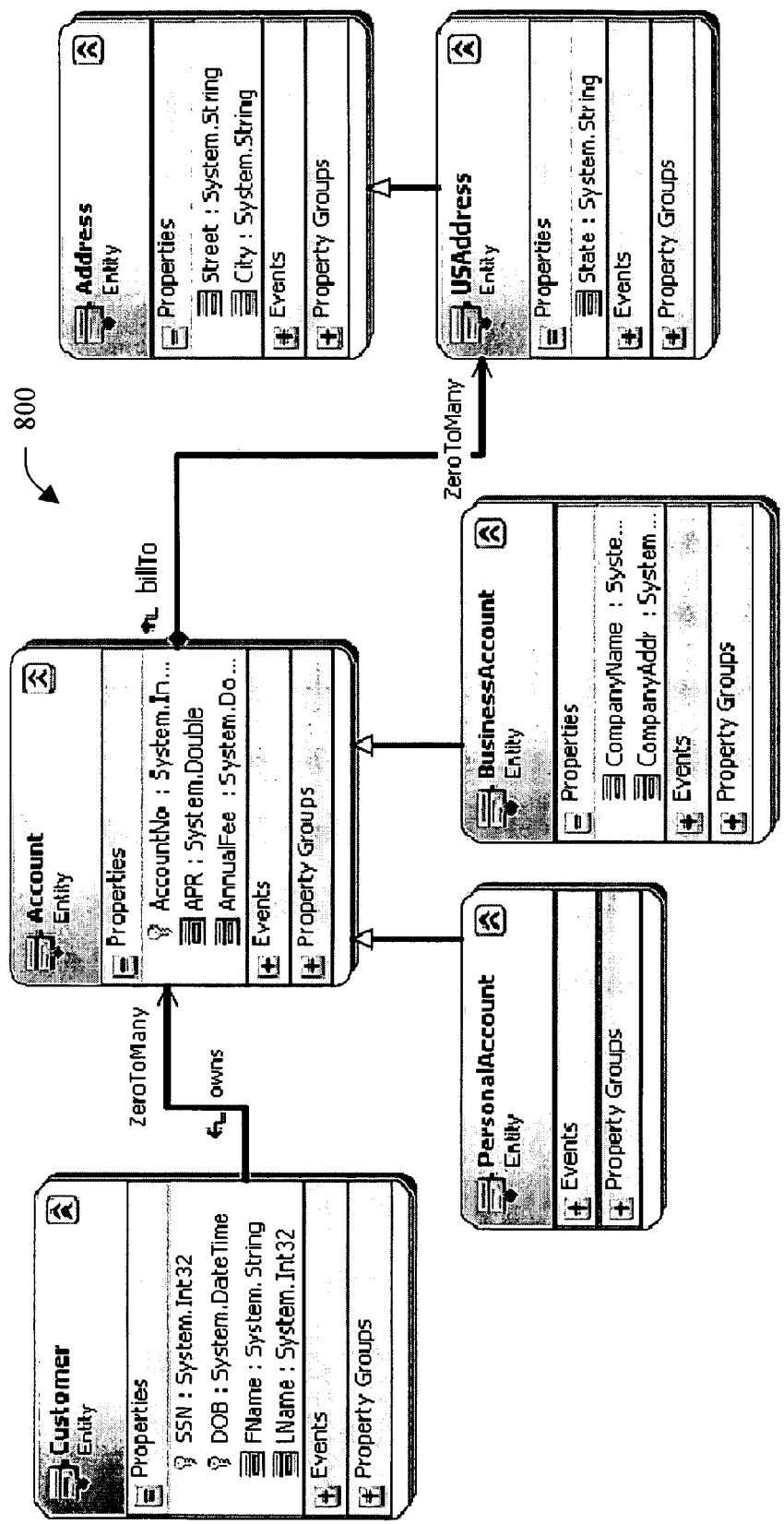
FIG. 8 is a screenshot of a schema containing several business entities.
Figure 9:
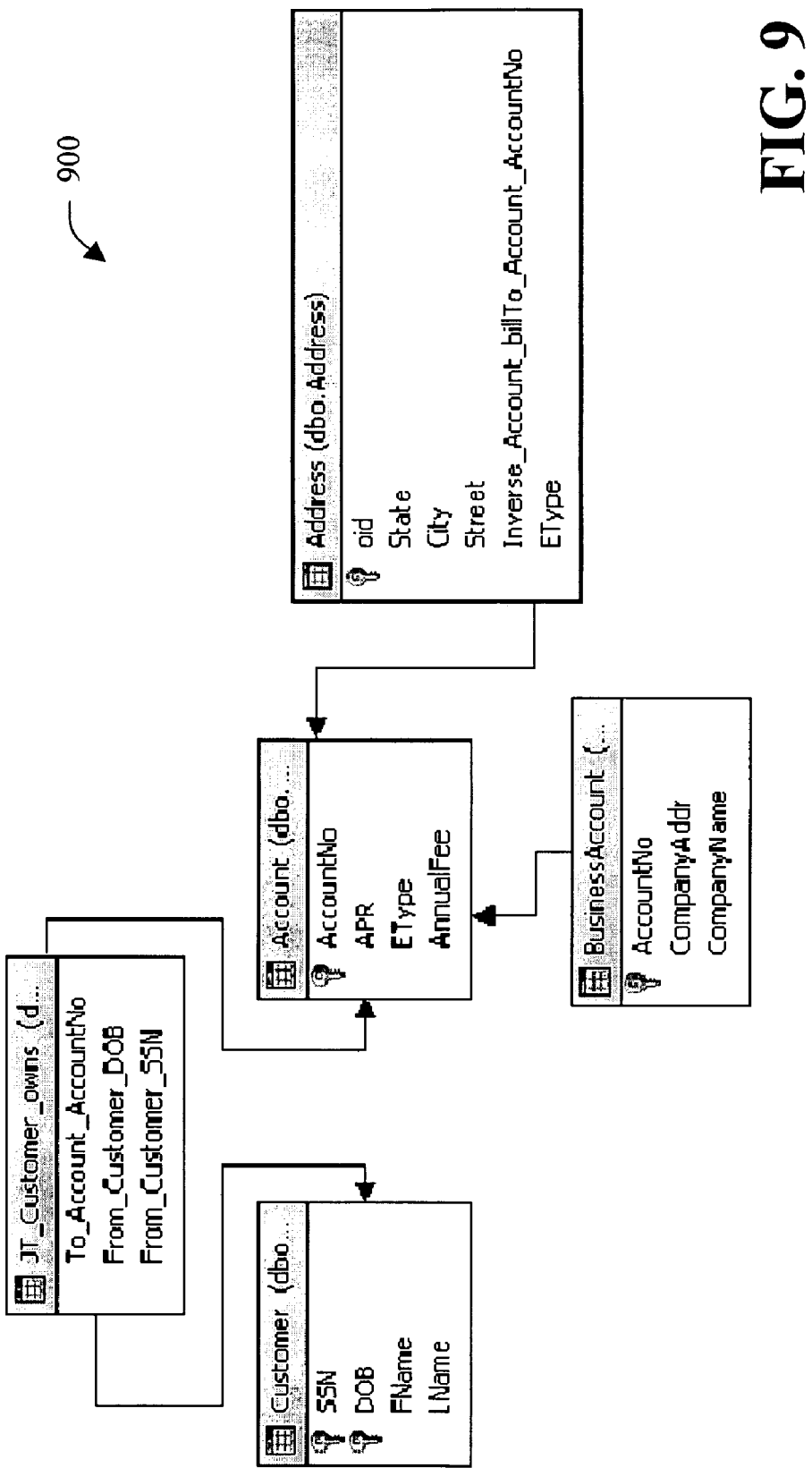
FIG. 9 is a diagram of a relational schema generated based on the schema of FIG. 8.

Referring to FIGS. 8 and 9, a sample business application employing the system 600 is illustrated. FIG. 8 is a screenshot 800 of a schema containing several business entities, which correspond directly to C# classes deployed in the application. The schema defines types for customers, (credit card) accounts, which are specialized into personal and business accounts, and addresses linked to the accounts. Customers are identified using a compound key (SSN, DOB). Each customer owns one or more accounts, which are billed to US addresses. Owns is an m:n-association, while billTo is an aggregation, that is, US addresses are existentially dependent on the accounts.

FIG. 9 illustrates the relational schema 900 generated by the system 600 from the source schema of FIG. 8. The relational schema 900 is shown in the Data Source view. In this example, m:n-associations are translated into join tables (so association owns becomes a join table JT_Customer_owns)

aggregation is translated into inverse attributes (hence, billTo becomes an inverse attribute Inverse_Account_billTo_Account_AccountNo_of_Address)

unique keys are added whenever source entities lack keys (so table Address contains an oid attribute)

each entity is turned into a relation that stores its non-inherited properties and inherited keys (e.g., table BusinessAccount stores CompanyName, but not the inherited AnnualFee).

Additionally, with the system 600 interactive modifications of the source schema result in incremental updates to the target schema. For example, renaming the property AccountNo in the source schema results in renaming of the corresponding relational attributes and constraints in the tables JT Customer owns, Account, BusinessAccount, and Address. As another example, changing the association-end multiplicity on owns from 0 . . . n ("ZeroOrMany") to 0 . . . 1 ("ZeroOrOne") replaces the join table JT_Customer_owns in the target schema by attribute owns_Account_AccountNo in the Customer table.

Default setting(s) can be modified by a user via the user interface component 710 to obtain a wide range of object-to-relational mappings. For example, in the scenario shown in FIGS. 8 and 9, the source schema is annotated such that no table USAddress is generated: USAddress and Address objects share the table Address and are distinguished using a flag attribute EType.

Under the default strategy, retrieving objects of type BusinessAccount requires a join of the tables Account and BusinessAccount. If most accounts are business accounts, the join can be avoided by storing all direct instances of the BusinessAccount class in one self-contained table:

BusinessAccount(AccountNo, APR, AnnualFee, CompanyName, CompanyAddress)

while the direct instances of Account and PersonalAccount are stored in the table Account. This and other strategies can be selected via annotations of the source schema as described above.

Additionally, the effect of choosing different strategies on the generated mappings and SQL views can be viewed. For example, the Customer objects can be reconstructed using the following view on the relational schema 900 of FIG. 9:

```
CREATE VIEW CustomerView AS
SELECT T1.SSN, T1.DOB, . . . , T5.AccountNo, T5.APR, . . .
FROM Customer T1 LEFT OUTER JOIN
  (SELECT T3.*, T4.*
  FROM Customer T3, JT_Customer_owns T2, Account T4
  WHERE T4.AccountNo = T2.To_Account_AccountNo AND
    T3.DOB = T2.From_Customer_DOB AND
    T3.SSN = T2.From_Customer_SSN) T5
ON T1.SSN = T5.SSN AND T1.DOB = T5.DOB
```

If the above-mentioned strategy is employed for mapping BusinessAccounts to a self-contained table, a different view definition is obtained, in which Accounts are retrieved as a union of Account and BusinessAccount tables:

```
CREATE VIEW CustomerView AS
    SELECT T1.SSN, T1.DOB, . . . , T7.AccountNo, T7.APR, . . .
    FROM Customer T1 LEFT OUTER JOIN
    (SELECT T3.*, T6.*
    FROM Customer T3, JT__Customer__owns T2,
        ((SELECT T4.AccountNo__FROM__Account T4
        WHERE T4.EType IN ('Account', 'PersonalAccount'))
    UNION (SELECT T5.AccountNo
        FROM BusinessAccount T5)) T6
    WHERE T6.AccountNo = T2.To__Account__AccountNo AND
        T3.DOB = T2.From__Customer__DOB AND
        T3.SSN = T2.From__Customer__SSN) T7
    ON T1.SSN = T7.SSN AND T1.DOB = T7.DOB 2
```

It is to be appreciated that the system 100, the mapping component 110, the abstraction component 120, the storage component 130, the system 200, the system 400, the inheritance mapping store 410, the mapping component 420, the system 600, the mapping component 610 and/or the user interface component 710 can be computer components as that term is defined herein.

Figure 10:
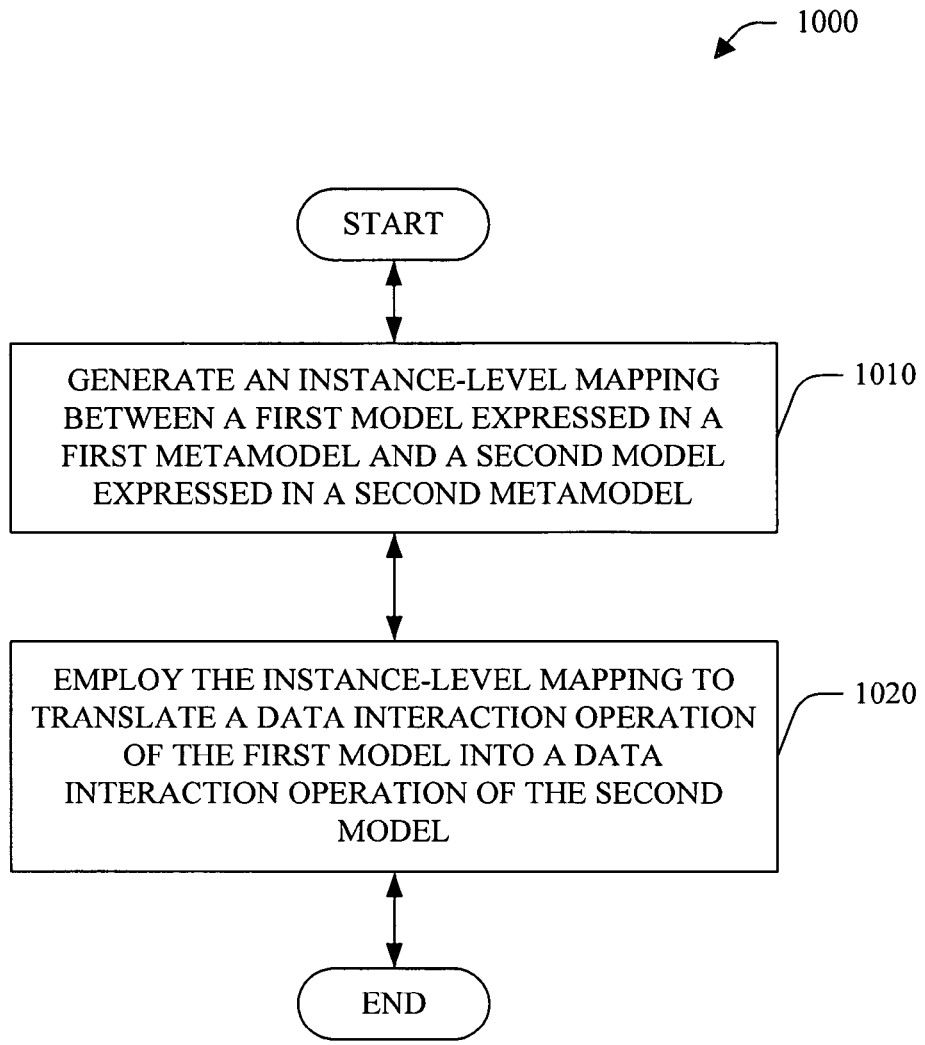
FIG. 10 is a flow chart of a method that facilitates data interaction.
Figure 11:
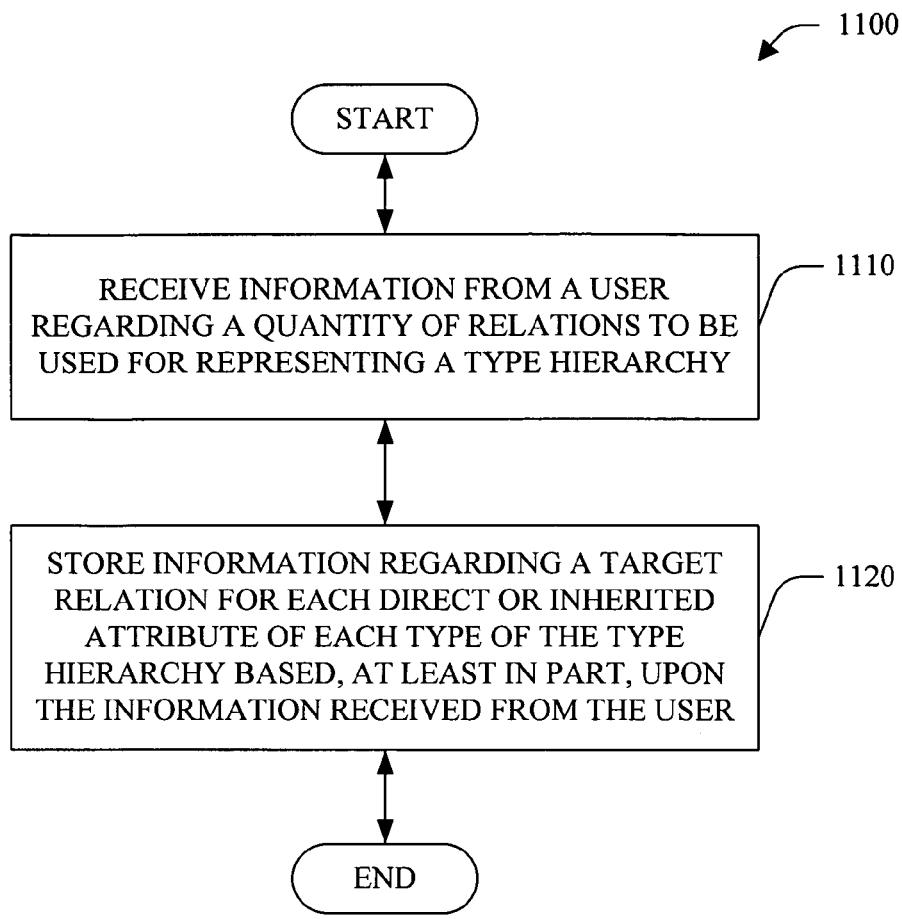
FIG. 11 is a flow chart of a method that facilitates inheritance mapping.
Figure 12:
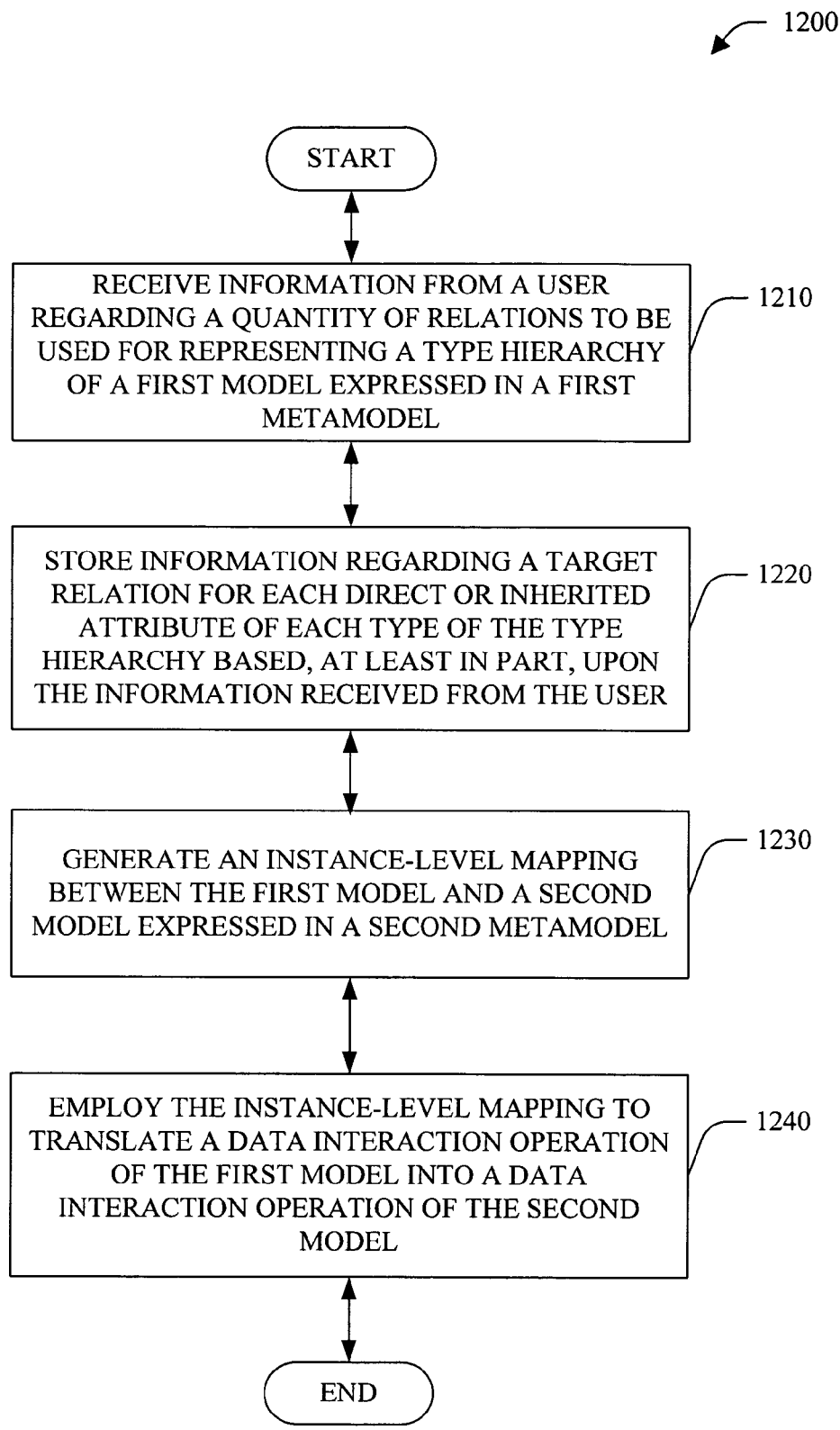
FIG. 12 is a flow chart of a method that facilitates data interaction.

Turning briefly to FIGS. 10-12, methodologies that may be implemented in accordance with the claimed subject matter are illustrated. While, for purposes of simplicity of explanation, the methodologies are shown and described as a series of blocks, it is to be understood and appreciated that the claimed subject matter is not limited by the order of the blocks, as some blocks may, in accordance with the claimed subject matter, occur in different orders and/or concurrently with other blocks from that shown and described herein. Moreover, not all illustrated blocks may be required to implement the methodologies.

The claimed subject matter may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 10, a method that facilitates data interaction 1000 is illustrated. At 1010, an instance-level mapping is generated between a first model expressed in a first metamodel and a second model expressed in a second metamodel. At 1020, the instance-level mapping is employed to translate a data interaction operation of the first model into a data interaction operation of the second model.

Next, turning to FIG. 11, a method facilitating inheritance mapping 1100 is illustrated. At 1110, information is received from a user regarding a quantity of relations to be used for representing a type hierarchy. For example, the information can be received via a user interface component and/or via an annotated source schema regarding inheritance strategies "Own", "All" or "None", as discussed previously. At 1120, information is stored (e.g., in a mapping table) regarding a target relation for each direct or inherited attribute of each type of the type hierarchy based, at least in part, upon the information received from the user. For example, the stored information (e.g., mapping table) can be employed to define forward and backward views of the type hierarchy.

Referring next to FIG. 12, a method that facilitates data interaction 1200 is illustrated. At 1210, information is received from a user regarding a quantity of relations to be used for representing a type hierarchy of a first model expressed in a first metamodel. At 1220, information is stored (e.g., in a mapping table) regarding a target relation for each direct or inherited attribute of each type of the type hierarchy based, at least in part, upon the information received from the user.

At 1230, an instance-level mapping is generated between the first model and a second model expressed in a second metamodel. At 1240, the instance-level mapping is employed to translate a data interaction operation of the first model into a data interaction operation of the second model.

Figure 13:
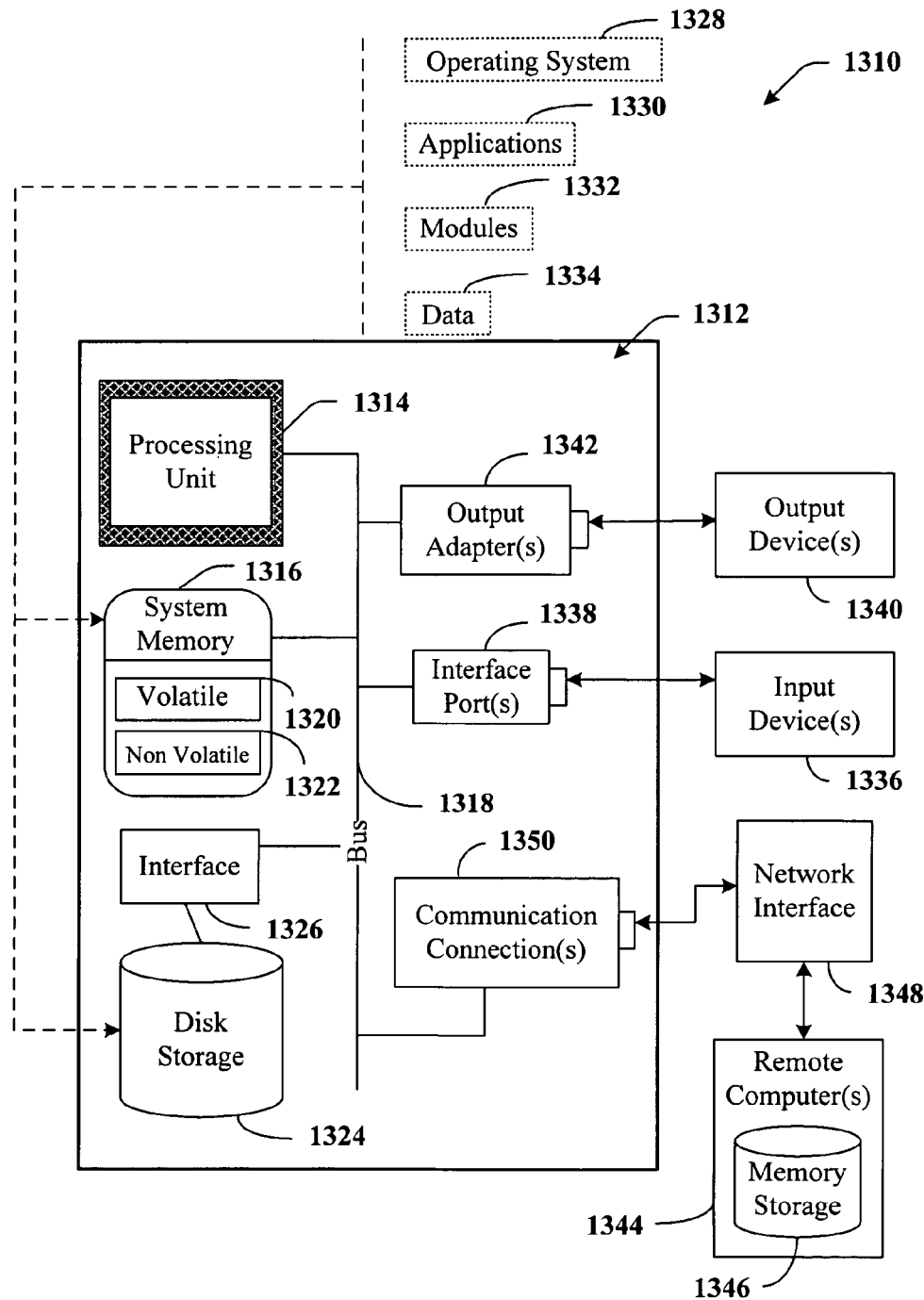
FIG. 13 illustrates an example operating environment.

In order to provide additional context for various aspects of the claimed subject matter, FIG. 13 and the following discussion are intended to provide a brief, general description of a suitable operating environment 1310. While the claimed subject matter is described in the general context of computer-executable instructions, such as program modules, executed by one or more computers or other devices, those skilled in the art will recognize that the claimed subject matter can also be implemented in combination with other program modules and/or as a combination of hardware and software. Generally, however, program modules include routines, programs, objects, components, data structures, etc. that perform particular tasks or implement particular data types. The operating environment 1310 is only one example of a suitable operating environment and is not intended to suggest any limitation as to the scope of use or functionality of the claimed subject matter. Other well known computer systems, environments, and/or configurations that may be suitable for use with the claimed subject matter include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 13, an exemplary environment 1310 includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable ROM (EEPROM), or flash memory. Volatile memory 1320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1312 also includes removable/nonremovable, volatile/nonvolatile computer storage media. FIG. 13 illustrates, for example a disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used such as interface 1326.

It is to be appreciated that FIG. 13 describes software that acts as an intermediary between users and the basic computer resources described in suitable operating environment 1310. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the claimed subject matter can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312, and to output information from computer 1312 to an output device 1340. Output adapter 1342 is provided to illustrate that there are some output devices 1340 like monitors, speakers, and printers among other output devices 1340 that require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A data interaction system comprising:
a computer processor for executing the following software components;
a mapping component that generates an instance-level mapping between a first model expressed in a first metamodel and a second model expressed in a second metamodel based, at least in part, upon a translation of the first model to the second model, the mapping component translates the first model into constructs of a universal metamodel, then executes transformations that eliminate from the first model all modeling constructs that are absent from the second model, and then translates remaining constructs into the second model;
wherein the universal metamodel includes main modeling constructs found in conventional metamodels and is extensible, such that the universal metamodel can be extended to include these additional constructs, and within the universal metamodel patterns are defined, each pattern represents a construct that may or may not appear in a given metamodel and is expressed as a conjunctive query, patterns are used to describe a metamodel and to annotate transformation rules to indicate their inputs and outputs;
an abstraction component that employs the instance-level mapping to bi-directionally translate a data interaction operation of the first model into a data interaction operation of the second model, wherein the second model is updated incrementally, and wherein a graphical layout of the second model is preserved during editing of the first model; and a storage component that stores the instance-level mapping to a computer-readable medium;

wherein the instance-level mapping is expressed in an algebraic data transformation language, the instance-level mapping incrementally modified by the mapping component based, at least in part, upon interaction from a user of the system; wherein the mapping component also includes functions that map unique identifiers of first model elements into unique identifiers of second model elements to generate Skolem functions; and an inheritance mapping data store that stores information regarding a target relation for each direct or inherited attribute of each type of a type hierarchy, the mapping component stores information in the inheritance mapping data store based, upon at least in part, information received from a user regarding a quantity of relations used for representing the type hierarchy, wherein the inheritance mapping data store provides a mechanism that subsumes all known inheritance mapping strategies and provides complete coverage of all possible mapping options.

2. The system of claim 1, the first metamodel being based upon at least one of a SQL metamodel, an XML metamodel, an Entity Relationship metamodel, a C# interface metamodel, a UML metamodel, a UDL metamodel and an object-oriented metamodel.

3. The system of claim 1, the mapping component caches generated elements to avoid regeneration of elements of the mapping that are unaffected by the incremental modification.

4. A data interaction system comprising:
a computer processor for executing the following software components;
an inheritance mapping data store that stores information regarding a target relation for each direct or inherited attribute of each type of a type hierarchy, wherein the inheritance mapping data store provides a mechanism that subsumes all known inheritance mapping strategies and provides complete coverage of all possible mapping options; and,
a mapping component that stores information in the inheritance mapping data store based, at least in part, upon information received from a user regarding a quantity of relations used for representing the type hierarchy;
wherein the information stored in the inheritance mapping data store employed to provide lossless, bi-directional data interaction between a first model expressed in a first metamodel and a second model expressed in a second metamodel; and
wherein the mapping component translates the first model into constructs of a universal metamodel and then translates the constructs into the second model, and wherein the universal metamodel includes main modeling constructs found in conventional metamodels and is extensible, such that the universal metamodel can be extended to include these additional constructs, and within the universal metamodel patterns are defined, each pattern represents a construct that may or may not appear in a given metamodel and is expressed as a conjunctive query, patterns are used to describe a metamodel and to annotate transformation rules to indicate their inputs and outputs.

5. The system of claim 4, a type of the type hierarchy annotated to use a particular inheritance strategy with respect to an inherited attribute.

6. The system of claim 5, the inherited attribute is stored in a relation associated with an ancestor type that defines the inherited attribute.

7. The system of claim 5, a direct instance of the type is stored in one relation which contains the inherited attribute.

8. The system of claim 5, no target relation is created and the inherited attribute is stored with a parent type.

9. A method that facilitates data interaction comprising:
generating an instance-level mapping between a first model expressed in a first metamodel and a second model expressed in a second metamodel, wherein the instance-level mapping expressed in an algebraic data transformation language;
translating the first model into constructs of a universal metamodel and then translating the constructs into the second model;
defining patterns within the universal metamodel, each pattern represents a construct that may or may not appear in a given metamodel and is expressed as a conjunctive query, patterns are used to describe a metamodel and to annotate transformation rules to indicate their inputs and outputs;
employing the instance-level mapping to translate a data interaction operation of the first model into a data interaction operation of the second model;
executing by a processor storing information regarding a target relation for each direct or inherited attribute of each type of a type hierarchy;
storing information in an inheritance mapping data store based, upon at least in part, information received from a user regarding a quantity of relations used for representing the type hierarchy; and
providing a mechanism that subsumes all known inheritance mapping strategies and provides complete coverage of all possible mapping options.

10. The method of claim 9, incrementally modifying the instance-level mapping based, at least in part, upon interaction from a user of the system.

11. The method of claim 9, further comprising storing information regarding a target relation for each direct or inherited attribute of each type of a type hierarchy.

12. The method of claim 11, storing information regarding the target relation is based, at least in part, upon information received from a user regarding a quantity of relations used for representing the type hierarchy.

* * * * *